United States Patent
Varonen et al.

(10) Patent No.: US 11,300,288 B2
(45) Date of Patent: Apr. 12, 2022

(54) METHOD AND A SYSTEM FOR MAINTAINING STEAM TEMPERATURE WITH DECREASED LOADS OF A STEAM TURBINE POWER PLANT COMPRISING A FLUIDIZED BED BOILER

(71) Applicant: Valmet Technologies Oy, Espoo (FI)

(72) Inventors: Mikko Varonen, Tampere (FI); Matti Nieminen, Espoo (FI)

(73) Assignee: Valmet Technologies Oy, Espoo (FI)

( * ) Notice: Subject to any disclaimer, the term of this patent is extended or adjusted under 35 U.S.C. 154(b) by 255 days.

(21) Appl. No.: 16/754,681

(22) PCT Filed: Oct. 17, 2018

(86) PCT No.: PCT/FI2018/050757
§ 371 (c)(1),
(2) Date: Apr. 8, 2020

(87) PCT Pub. No.: WO2019/086752
PCT Pub. Date: May 9, 2019

(65) Prior Publication Data
US 2020/0363056 A1    Nov. 19, 2020

(30) Foreign Application Priority Data
Nov. 2, 2017   (FI) ..................... 20175975

(51) Int. Cl.
*F22G 3/00*    (2006.01)
*F01K 3/24*    (2006.01)
(Continued)

(52) U.S. Cl.
CPC .................. *F22G 3/00* (2013.01); *F01K 3/24* (2013.01); *F22B 31/0084* (2013.01); *F22G 1/16* (2013.01)

(58) Field of Classification Search
CPC ..... F22G 3/00; F22G 1/16; F22G 5/16; F01K 3/24; F22B 31/0084; F22B 31/04; Y02P 80/15
(Continued)

(56) References Cited

U.S. PATENT DOCUMENTS 4,969,930 A * 11/1990 Arpalahti ................. C10J 3/523
48/210
5,133,943 A    7/1992 Abdulally
(Continued)

OTHER PUBLICATIONS

International Searching Authority, International Search Report and Written Opinion for International Application No. PCT/FI2018/050757, dated Jan. 15, 2019, (12 pages), European Patent Office, Rijswijk, Netherlands.
(Continued)

*Primary Examiner* — Hoang M Nguyen
(74) *Attorney, Agent, or Firm* — Alston & Bird LLP

(57) ABSTRACT

The solution comprises a method of and a system for maintaining steam temperature and therefore electricity production efficiency with decreased loads of a steam turbine power plant comprising a fluidized bed boiler (12) and a fluidized bed superheater (2) adapted to superheat steam supplied to a steam turbine (3). According to the solution, the steam temperature may be maintained by providing, outside a furnace (10), additional heating to the fluidized bed material in its outer circulation, thereby increasing the amount of thermal energy available in the fluidized bed material to be transferred in the fluidized bed superheater (2) to the steam supplied to the steam turbine (3). Such additional heating may be performed by selectably supplying combustible gas with nozzles (111) into and/or burned with a burner in or in the vicinity of the fluidized bed material outside the furnace (10). As an additional aspect of the
(Continued)

Figure 1:
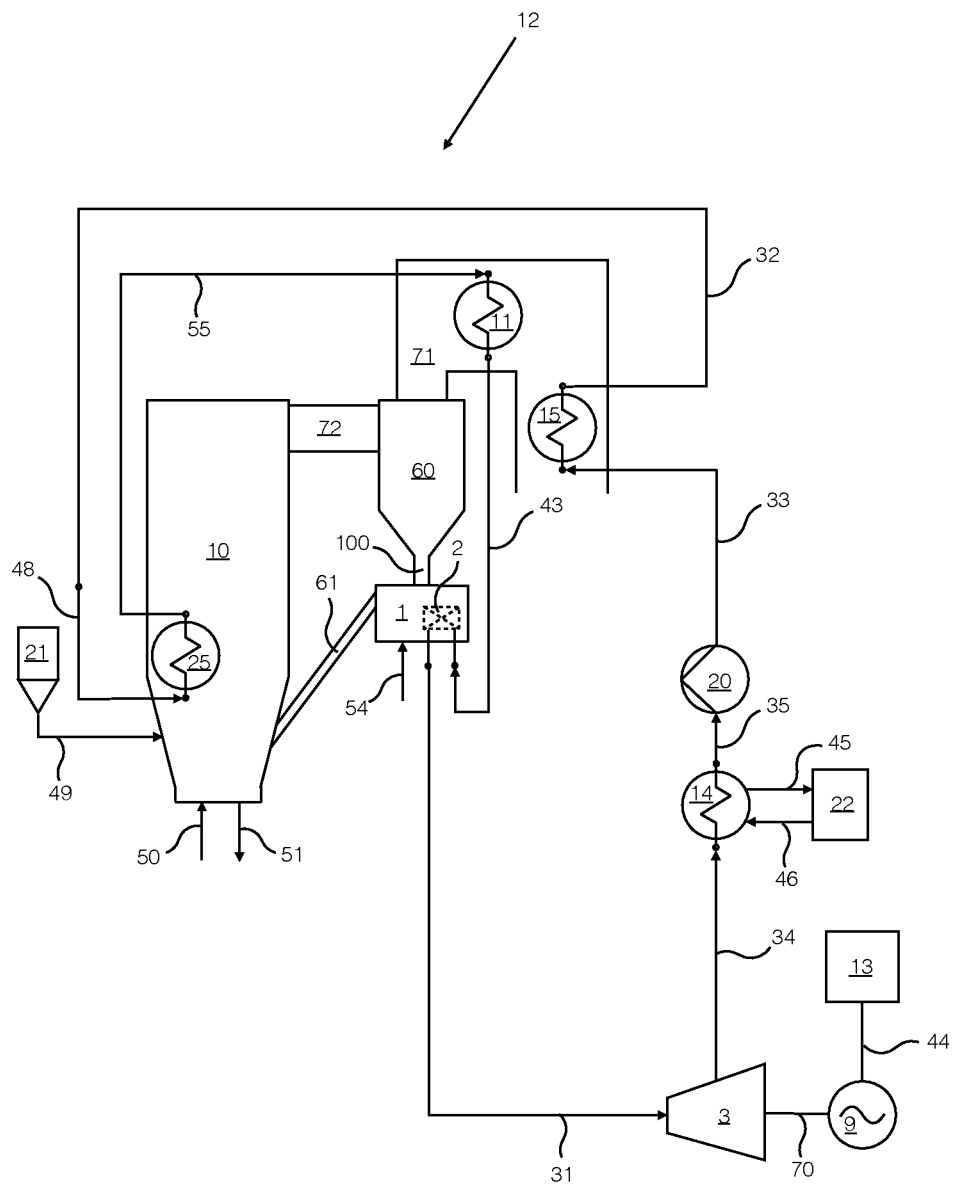

disclosed solution, the combustible gas may be produced with a gasifier (4).

25 Claims, 13 Drawing Sheets

(51) Int. Cl.
*F22B 31/00* (2006.01)
*F22G 1/16* (2006.01)

(58) Field of Classification Search
USPC .............................. 122/1 R, 4 D; 60/670–681
See application file for complete search history.

(56) References Cited

U.S. PATENT DOCUMENTS

| | | | |
|---|---|---|---|
| 5,239,946 A | | 8/1993 | Garcia-Mallol |
| 5,682,828 A | * | 11/1997 | Phalen ................... F23C 10/10 110/263 |
| 6,962,676 B1 | | 11/2005 | Hyppänen |
| 7,194,983 B2 | * | 3/2007 | Kokko ................... F23C 10/18 122/4 D |
| 8,171,893 B2 | * | 5/2012 | Morin ..................... F23C 10/18 122/4 D |

OTHER PUBLICATIONS

International Preliminary Examining Authority, Written Opinion of the International Preliminary Examining Authority for International Application No. PCT/FI2018/050757, dated Sep. 30, 2019, (4 pages), European Patent Office, Munich, Germany.

International Preliminary Examining Authority, Notification of the Transmittal of the International Preliminary Report On Patentability for International Application No. PCT/F12018/050757, dated Feb. 7, 2020, (22 pages), European Patent Office, Munich, Germany.

* cited by examiner

METHOD AND A SYSTEM FOR MAINTAINING STEAM TEMPERATURE WITH DECREASED LOADS OF A STEAM TURBINE POWER PLANT COMPRISING A FLUIDIZED BED BOILER

CROSS REFERENCE TO RELATED APPLICATIONS

This application is a National Stage Application, filed under 35 U.S.C. 371, of International Application No. PCT/FI2018/050757, filed Oct. 17, 2018, which international application claims priority to and the benefit of Finnish Application No. 20175975, filed Nov. 2, 2017; the contents of both of which as are hereby incorporated by reference in their entireties.

BACKGROUND

RELATED FIELD

The disclosed solution relates to the operation of a steam turbine power plant comprising a fluidized bed boiler for steam generation.

DESCRIPTION OF RELATED ART

Steam turbine power plants are commonly used for production of electricity. In combined heat and power (CHP) plants, thermal energy not captured by the steam turbine is additionally utilized as useful heat.

In steam turbine power generation, a boiler, burning suitable fuel in a furnace, produces steam with a mass flow rate, which steam is conveyed to a steam turbine. Steam refers to a circulating substance such as water in a gaseous state. In the boiler, thermal energy released by the burnt fuel is transferred into the water circulating in the system, or other such circulating medium.

In a system comprising a circulating fluidized bed (CFB) boiler, fluidized bed material circulates in the system and transfers thermal energy from the furnace, to elsewhere in the system. The thermal energy in the fluidized bed material is typically employed to heat, vaporize, superheat and to provide final superheating for the steam to be supplied to the steam turbine. The final superheating is typically performed with a fluidized bed superheater with which the fluidized bed material comes into contact in its outer circulation.

The steam entering the steam turbine is typically pressurized at 80-180 bar and has a temperature typically in the range of 450-560° C. That is, the steam entering the steam turbine typically is in a superheated state. Typically, when a power plant is in operation, i.e. electricity is being produced, the pressure of the steam entering the turbine is kept constant while its temperature may change. The steam turbine converts thermal energy in the steam into rotary motion on the turbine output shaft. This shaft then drivers an electric generator via a suitable driveline.

Currently, decreasing the load of a steam turbine power plant adversely effects the efficiency with which the steam turbine power plant produces electricity. Decreasing the load of the power plant may significantly reduce the outer circulation of the fluidized bed material or stop it altogether, in which case the supply of thermal energy within the fluidized bed material to a fluidized bed superheater located outside the furnace may be significantly reduced or cease altogether. This, in turn, adversely and significantly effects the temperature of the steam supplied to the steam turbine.

In addition, as decreasing the load of the power plant reduces the amount of thermal energy transferrable to the steam fed into the steam turbine, this typically implies that the temperature of the steam fed to the steam turbine gets lower as the load of the power plant gets lower. This is undesirable because steam with lower temperature may condense prematurely as it travels through the steam turbine, wherein water droplets may form which, in turn, may hit turbine blades creating blade damage.

BRIEF SUMMARY

The solution comprises a method and a system for additionally heating fluidized bed material outside a furnace of a boiler of a steam turbine power plant in order to maintain the temperature of steam supplied to a steam turbine with decreased loads of the power plant.

The boiler is of a circulating fluidized bed (CFB) type, whereby the fluidized bed material may circulate in the system. More specifically, the fluidized bed material may circulate between a furnace, a solids separator and a loop seal, which circulation is referred to as the outer circulation of the fluidized bed material. The loop seal may comprise a fluidized bed superheater or it may be in connection with a fluidized bed superheater.

In such a system, the amount of thermal energy available to be transferred from the fluidized bed material to the steam with the fluidized bed superheater is typically dependent on the amount of thermal energy transferred to the fluidized bed material earlier in the outer circulation in the furnace and as a result of burning fuel in the furnace. Consequently, the less fuel is being burned in the furnace, the less thermal energy may be available in the fluidized bed material to be transferred to the steam with the fluidized bed superheater. The less thermal energy is transferred to the steam in the fluidized bed superheater, the lower may be the temperature of the steam exiting the fluidized bed superheater and subsequently entering the steam turbine, especially when conventional means of preventing the dropping of the temperature of the steam have been exhausted. Such conventional means may comprise reducing the attemperation of steam with water spraying and/or increasing the proportion of the fluidized bed material in the outer circulation travelling via the fluidized bed superheater.

As the generation of thermal energy in the furnace is reduced as a result of burning less fuel in the furnace, the outer circulation of the fluidized bed material may be reduced in terms of mass flow of the circulating fluidized bed material. This also has the effect of reducing the amount of thermal energy available to be transferred from the circulating fluidized bed material into the steam in the fluidized bed superheater.

With very low loads of the power plant, the outer circulation of the fluidized bed material may cease or nearly cease. As a result, the arrival of thermal energy with the fluidized bed material to the fluidized bed superheater may cease or nearly cease.

Consequently, as the thermal energy available to be transferred in the fluidized bed superheater into the steam to be supplied to the steam turbine is reduced, the temperature of the steam may be reduced as a result. This may have adverse and undesirable consequences such as the reduction of efficiency with which electricity is produced with the steam turbine.

As another example of such adverse and undesirable consequences, said steam with a reduced temperature may condense prematurely while travelling through the steam turbine, causing water droplets being formed which may hit and thereby damage the blades of the steam turbine.

The disclosed solution is intended to alleviate such adverse and undesirable consequences of reduced power plant load by disclosing a method and a system for introducing additional thermal energy to the fluidized bed material outside the furnace. With the disclosed solution, it is possible to ensure that the fluidized bed material in contact and in the vicinity of the fluidized bed superheater has sufficient amount of thermal energy to be transferred into the steam supplied to the steam turbine even under circumstances in which the outer circulation of the fluidized bed material has diminished significantly or ceased.

Thus, with the disclosed solution, the reduced production of thermal energy in the furnace and therefore the reduced transfer of thermal energy to the fluidized bed material in the furnace can be compensated by additionally heating the fluidized bed material outside the furnace. Therefore, with the disclosed solution, the temperature of the steam can be maintained sufficiently high even with a reduced power plant load.

Such additional heating of the fluidized bed material may occur, for example in the loop seal heat exchanger chamber, and/or in a combustion chamber which combustion chamber is arranged adjacent to the loo seal heat exchanger chamber such that there is a circulation of fluidized bed material between the loop seal heat exchanger chamber and the combustion chamber, and/or in a heat exchanger chamber which heat exchanger chamber houses the fluidized bed superheater and is arranged adjacent to the furnace, and/or in a gas lock located between a dip leg and a heat exchanger which heat exchanger chamber houses the fluidized bed superheater and is arranged adjacent to the furnace, and/or in a heat exchanger chamber housing at least one superheater and arranged adjacent to a loop seal chamber devoid of any superheater(s).

According to the disclosed solution, such additional heating of the fluidized bed material may be done by selectably supplying, i.e. selectably injecting, combustible gas into the fluidized bed material outside the furnace, whereby the combustion of the combustible gas releases additional thermal energy into the fluidized bed material. As further possibilities for additionally heating the fluidized bed material outside the furnace, such additional heating of the fluidized bed material may be done by selectably supplying combustible gas to a burner or burners located outside the furnace, whereby the burning of the combustible gas with the burner(s) releases additional thermal energy into the fluidized bed material. Furthermore, such injection-based and buner-based solutions may be combined to comprise both injection and burning with a burner combustible gas in a selected system location as outlined above.

According to the disclosed solution, combustible gas may be selectably injected into a loop seal heat exchanger chamber, or into a combustion chamber, or into a heat exchange chamber adjacent to the furnace, or into a heat exchanger chamber adjacent to the loop seal chamber. As further possibilities, combustible gas may be selectably supplied to and burned with a burner or burners in a loop seal heat exchanger chamber, or in a combustion chamber, or in a heat exchange chamber adjacent to the furnace, or in a heat exchanger chamber adjacent to the loop seal chamber. Furthermore, such injection-based and buner-based solutions may be combined to comprise both injection and burning with a burner combustible gas in a selected system location as outlined above.

As an additional possibility according to the disclosed solution, the combustible gas may be produced by gasification.

The selectable injection and/or burning of combustible gas to additionally heat the fluidized bed material outside the furnace may be effected by a control unit. The control unit may bring about such selectable injection and/or burning by using, for example, the load of the power plant as input data. Thereby, the injection and/or burning of combustible gas may be initiated, for example, once the load of the power plant decreases below a trigger load. Such a trigger load may be set for example such that it is the load or is near to the load below which the temperature of the steam entering the steam turbine can not be maintained at or near its maximum temperature with conventional means. Such conventional means may comprise reducing the attemperation of steam with water spraying and/or increasing the proportion of the fluidized bed material in the outer circulation travelling via the fluidized bed superheater.

Alternatively, and as another example, the control unit may bring about such selectable injection and/or burning of combustible gas by using, for example, steam quality measurements as input data. This input data may comprise, for example, the temperature of the steam entering the steam turbine. Thereby, the injection and/or burning of combustible gas may be initiated, for example, once the temperature of the steam entering the steam turbine drops below a specified alert temperature.

Therefore, with the disclosed solution, the temperature of the steam entering the steam turbine can be maintained sufficiently high even with reduced power plant loads, i.e. when the production of thermal energy in the furnace is not, by itself, sufficient to maintain the temperature of the steam entering the steam turbine sufficiently high.

In this context, a sufficiently high temperature means a temperature with which the efficiency of electricity production is at or near the maximum efficiency obtainable with the full power plant load. Sufficiently high temperature may be a temperature which is the maximum temperature of the steam entering the steam turbine which may be obtainable with the full power plant load. Alternatively, sufficiently high temperature may be 1-10° C. lower, or 10-20° C. lower, or 20-30° C. lower, or 30-40° C. lower, or 40-50° C. lower, or 50-60° C. lower than the maximum temperature of the steam entering the steam turbine.

Thus, with the disclosed solution, the efficiency of electricity production in a steam turbine power plant can be maintained at a high level even with reduced power plant loads.

The additional heating of the fluidized bed material according to the disclosed solution advantageously requires no modifications in the steam circulation and supplying system of the power plant.

A method according to the disclosed solution comprises maintaining the temperature of steam supplied to a steam turbine of a steam turbine power plant, which power plant may further comprise a circulating fluidized bed boiler comprising a furnace and a fluidized bed superheater adapted to superheat steam supplied to the steam turbine by transferring thermal energy to said steam from fluidized bed material. According to the method, the temperature of steam supplied to a steam turbine may be maintained by means of selectably additionally heating the fluidized bed material outside the furnace. The method may comprise selecting a trigger load for the power plant which trigger load is less than the full rated load of the power plat and is greater than the minimum rated viable load of the power plant, determining the load of the power plant, and when the load of the power plant is at or above the trigger load, superheating steam with the fluidized bed superheater such that the temperature of the superheated steam entering the steam turbine is at or near its maximum temperature; and when the load of the power plant is below the trigger load, superheating steam with the fluidized bed superheater, and additionally heating the fluidized bed material outside the furnace such that the temperature of superheated steam entering the steam turbine is at or near its maximum temperature, and conveying the superheated steam from the fluidized bed superheater to the steam turbine.

According to the disclosed solution, the additional heating of the fluidized bed material may occur, with respect to the outer circulation of the fluidized bed material, at or before the fluidized bed superheater (2) and after the fluidized bed material has exited the furnace (10), or at or before the fluidized bed superheater (2) but not earlier than the entrance of the fluidized bed material into a loop seal heat exchanger chamber (1).

According to the disclosed solution, the additional heating of the fluidized bed material may be brought about by the combustion of combustible gas injected into, or burned with a burner or burners within or in the vicinity of the fluidized bed material.

A system according to the disclosed solution may comprise a steam turbine, a circulating fluidized bed boiler comprising a furnace and a fluidized bed superheater adapted to superheat steam supplied to the steam turbine by transferring thermal energy to said steam from fluidized bed material. A system according to the disclosed solution may further comprise a control unit adapted to receive a set value for maintained trigger load for a power plant comprising the system, determine the load of the power plant, and when the load of the power plant is below the trigger load which trigger load is less than the full rated load of the power plant and greater than the minimum rated viable load of the power plant, control the injection of combustible gas into, or burning with a burner within or in the vicinity of the fluidized bed material outside the furnace such that the temperature of steam entering the steam turbine is maintained at or near its maximum temperature.

In addition, a system according to the solution may comprise a gasifier adapted to generate product gas, and lines adapted to convey the product gas from the gasifier to gas injection nozzles for injection, or to burners(s) for burning, as the combustible gas.

BRIEF DESRCIPTON OF THE FIGURES

FIG. 1 schematically illustrates a conventional steam production system of a power plant.

Figure 2:
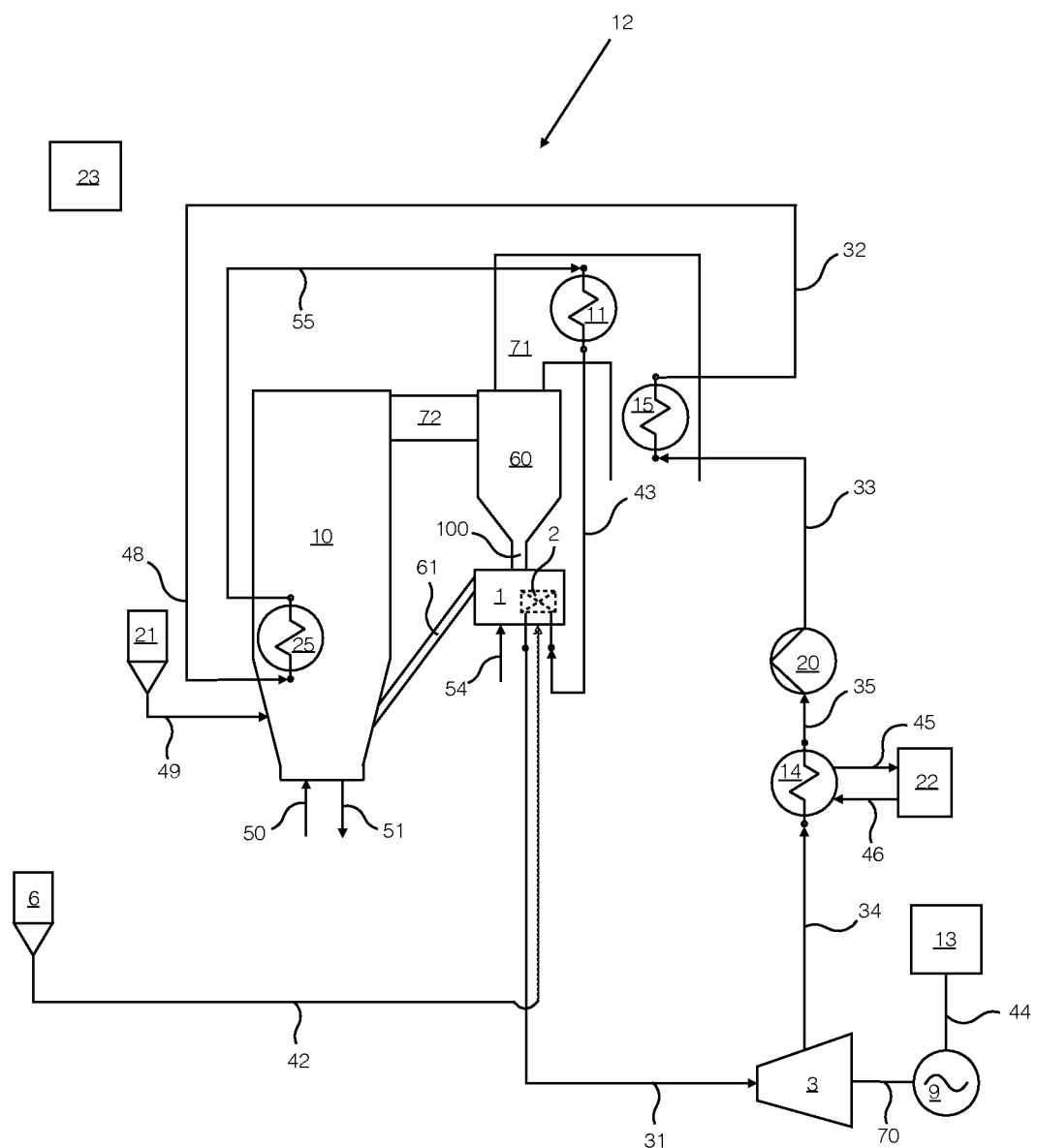

FIG. 2 schematically illustrates the steam production system of a power plant according to an example, the system comprising selectably supplying combustible gas to be combusted in a loop seal heat exchanger chamber.

Figure 3:
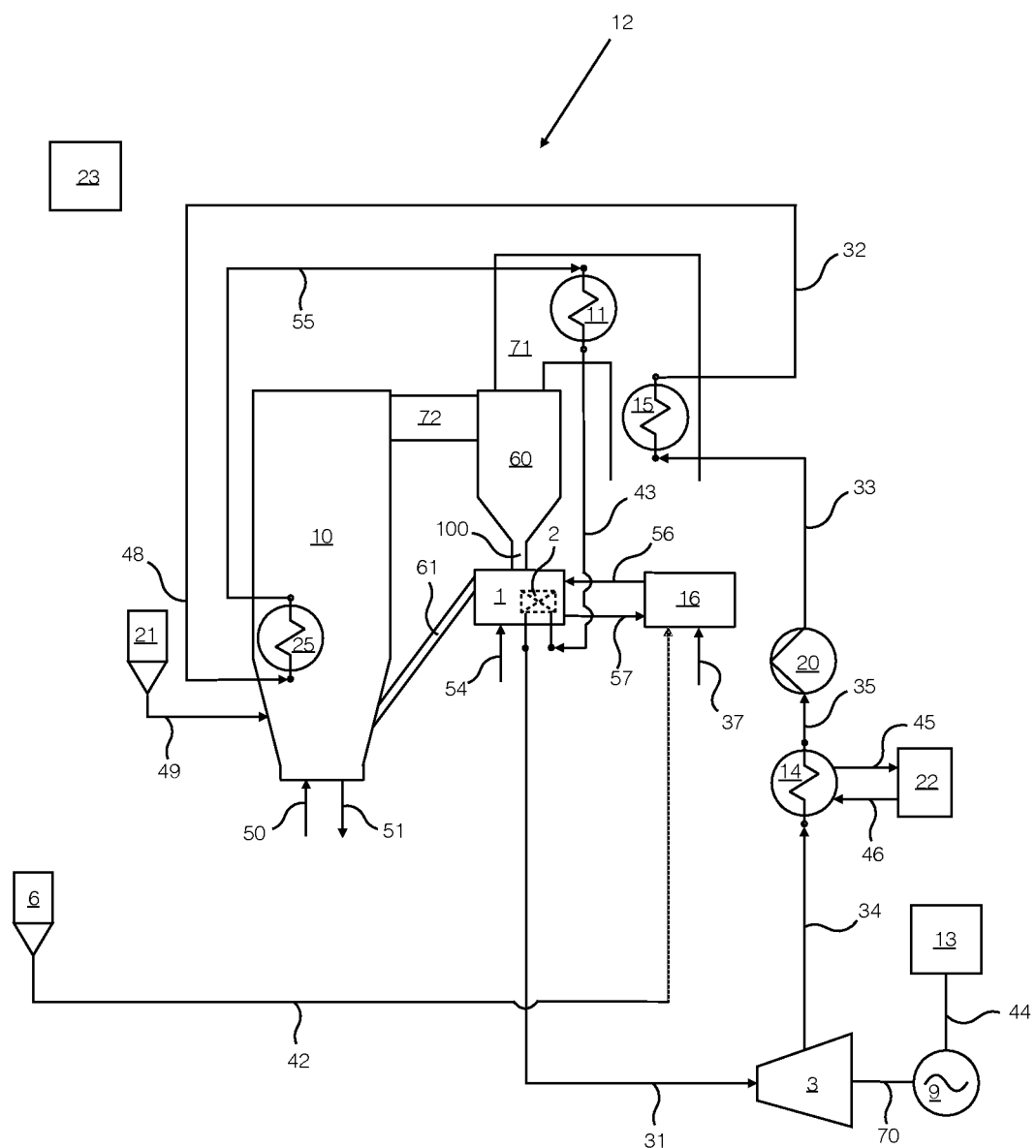

FIG. 3 schematically illustrates the steam production system of a power plant according to an example, the system comprising selectably supplying combustible gas to be combusted in a combustion chamber.

Figure 4A:
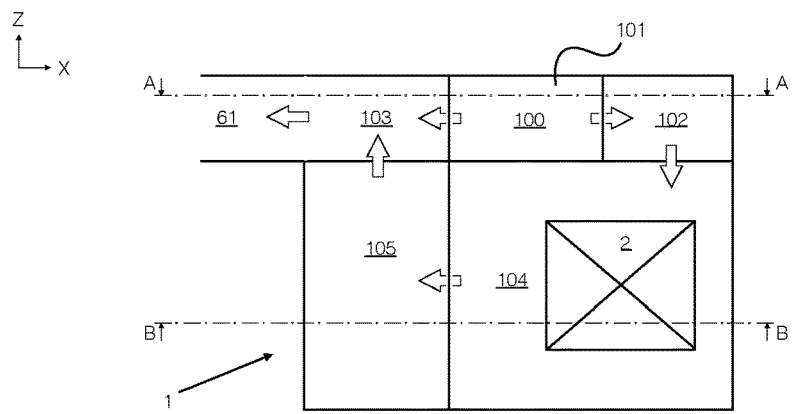
Figure 4B:
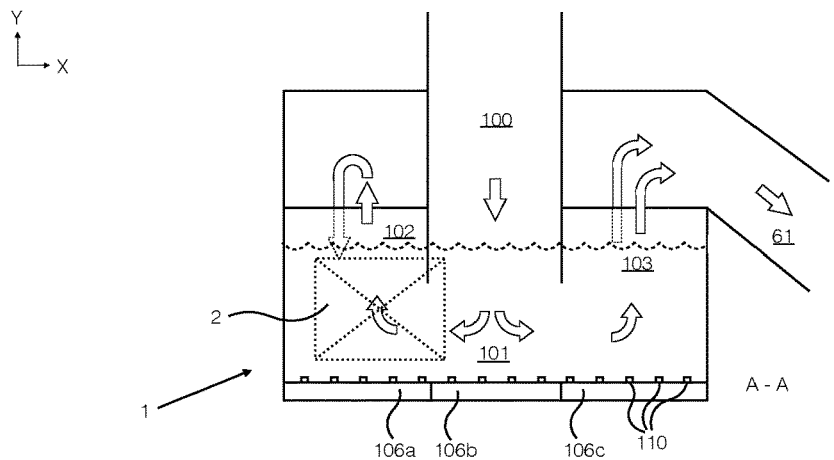
Figure 4C:
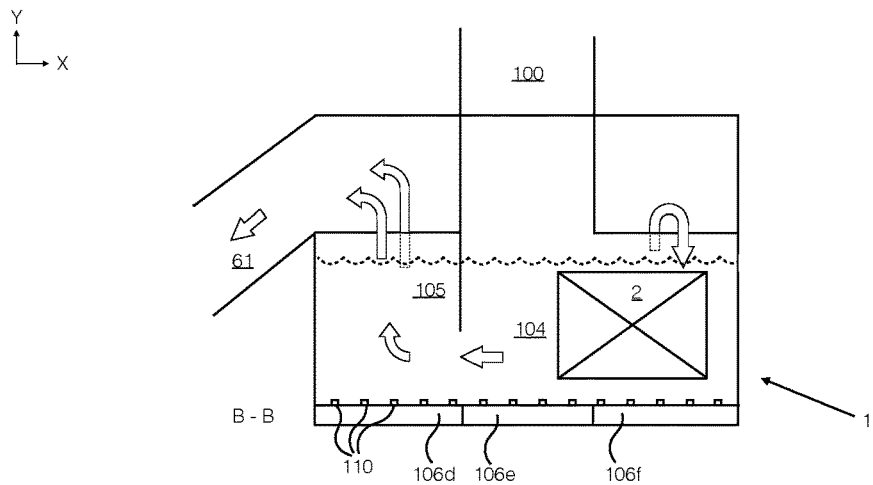

FIGS. 4*a*-*c* schematically illustrate a conventional loop seal heat exchanger chamber from different cross-sectional perspectives.

Figure 5A:
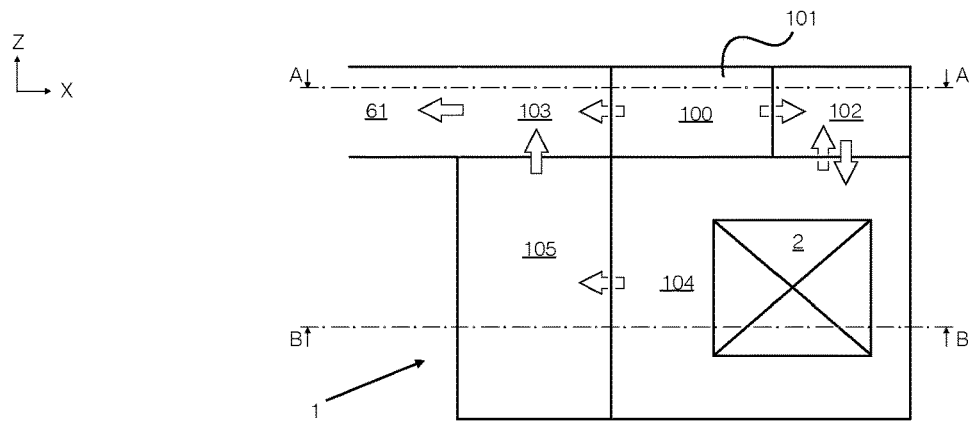

FIG. 5*a* schematically illustrates, according to an example, a loop seal heat exchanger chamber comprising selectable injection of combustible gas, in a cross-sectional perspective as viewed from above.

Figure 5B:
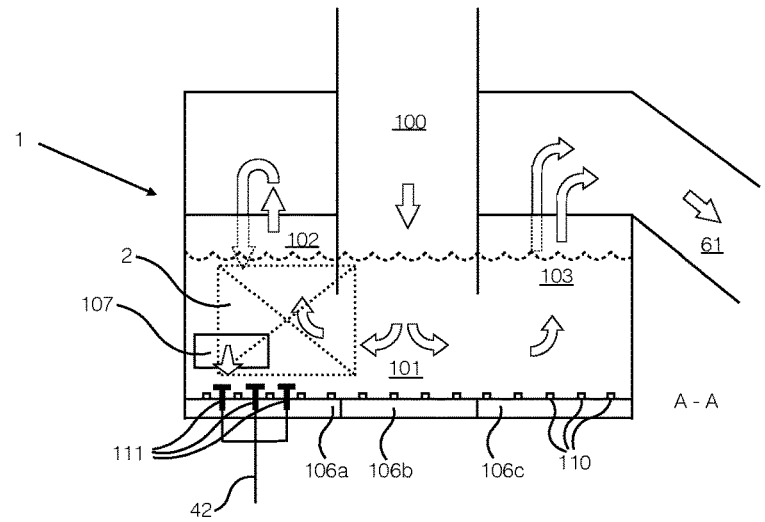

FIG. 5*b* schematically illustrates, according to an example, a loop seal heat exchanger chamber comprising selectable injection of combustible gas, in a cross-sectional perspective A-A in denotational accordance with FIG. 5*a*.

Figure 5C:
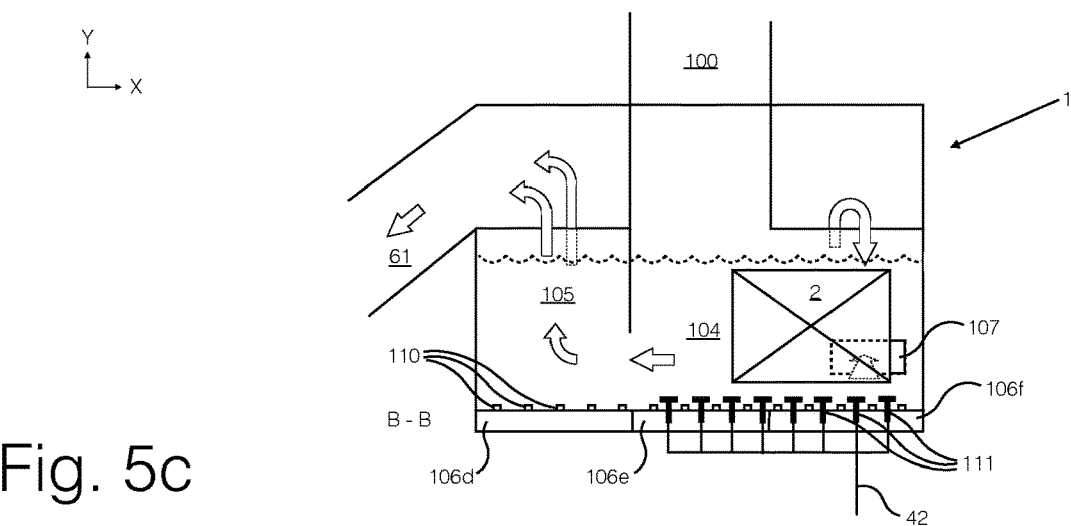

FIG. 5*c* schematically illustrates, according to an example, a loop seal chamber comprising selectable injection of combustible gas, in a cross-sectional perspective B-B in denotational accordance with FIG. 5*a*.

Figure 6:
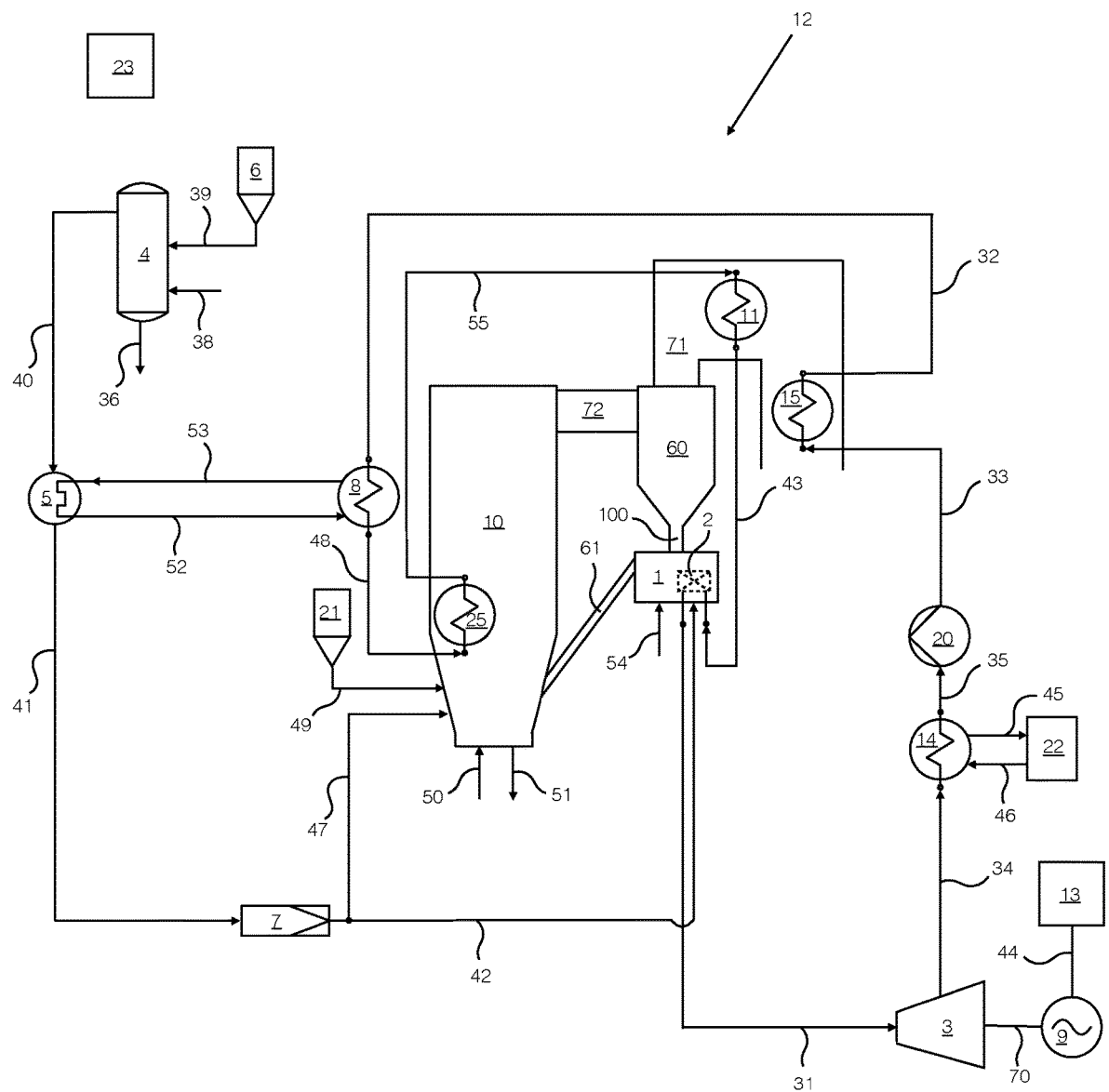

FIG. 6 schematically illustrates the steam production system of a power plant according to FIG. 2, the system further comprising producing combustible gas to be supplied to the loop heat exchanger seal chamber in a gasifier.

Figure 7:
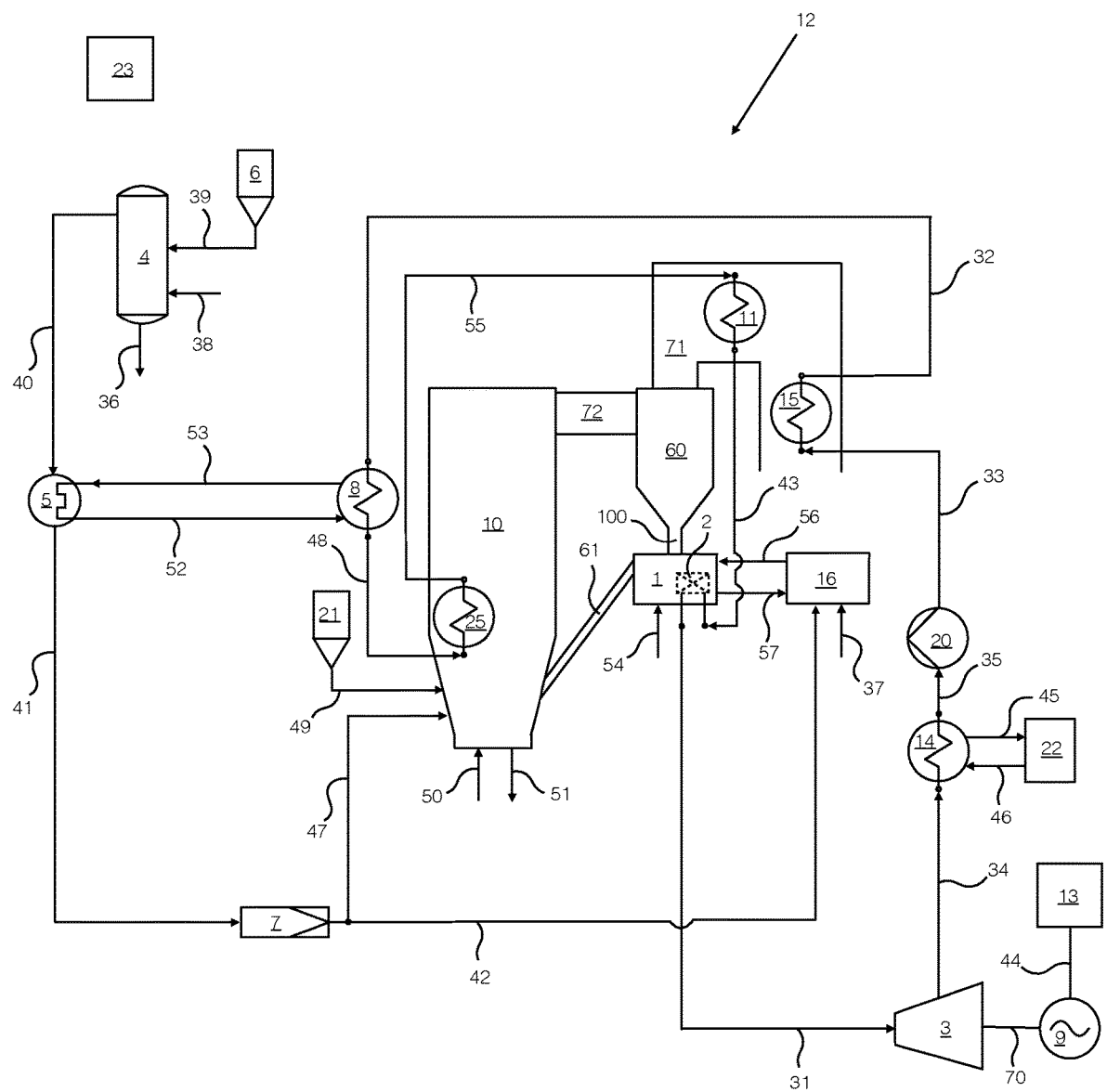

FIG. 7 schematically illustrates the steam production system of a power plant according to FIG. 3, the system further comprising producing combustible gas to be supplied to the combustion chamber in a gasifier.

Figure 8:
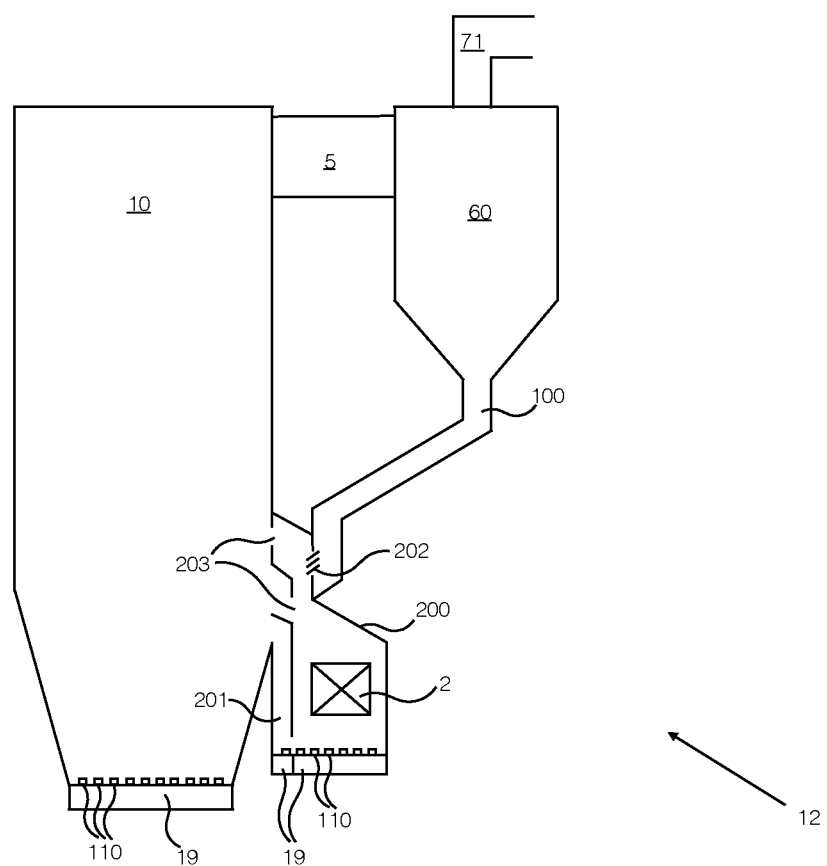

FIG. 8 schematically illustrates a conventional arrangement of a heat exchanger chamber adjacent to a boiler, wherein the heat exchanger houses a superheater.

Figure 9A:
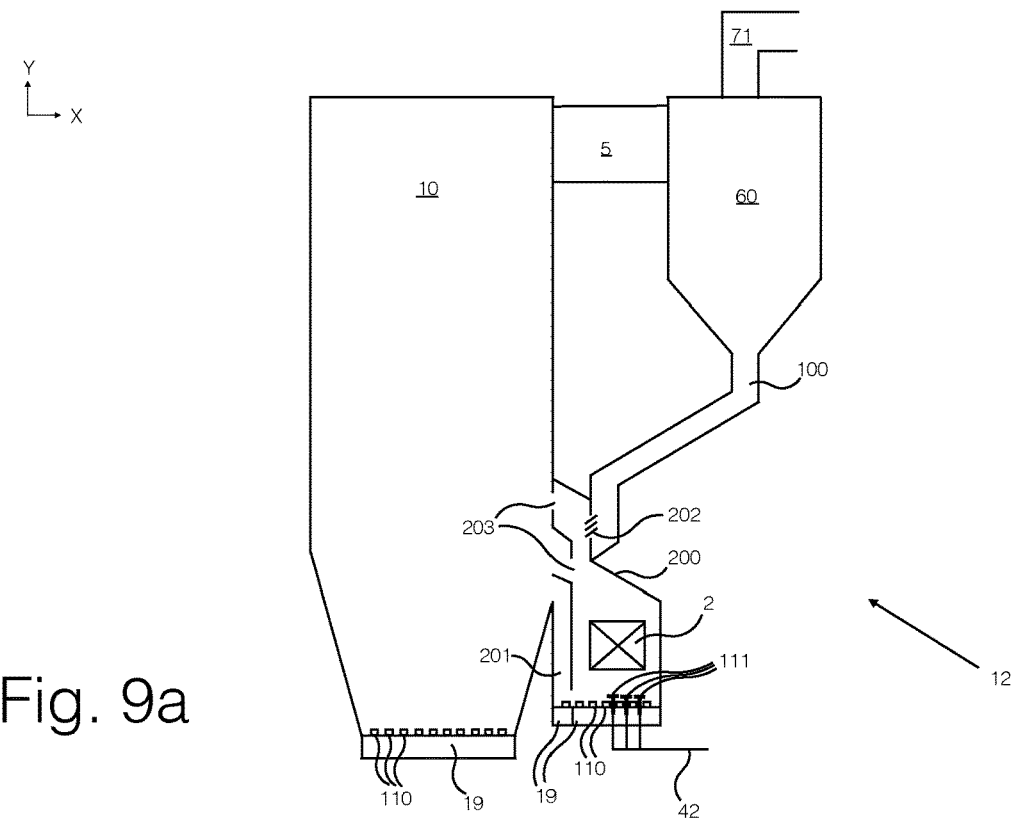

FIG. 9*a* schematically illustrates, according to an example, an arrangement of a heat exchanger chamber adjacent to a boiler, wherein the heat exchanger houses a superheater, and wherein the arrangement additionally comprises selectably supplying combustible gas to be combusted in the heat exchanger chamber.

Figure 9B:
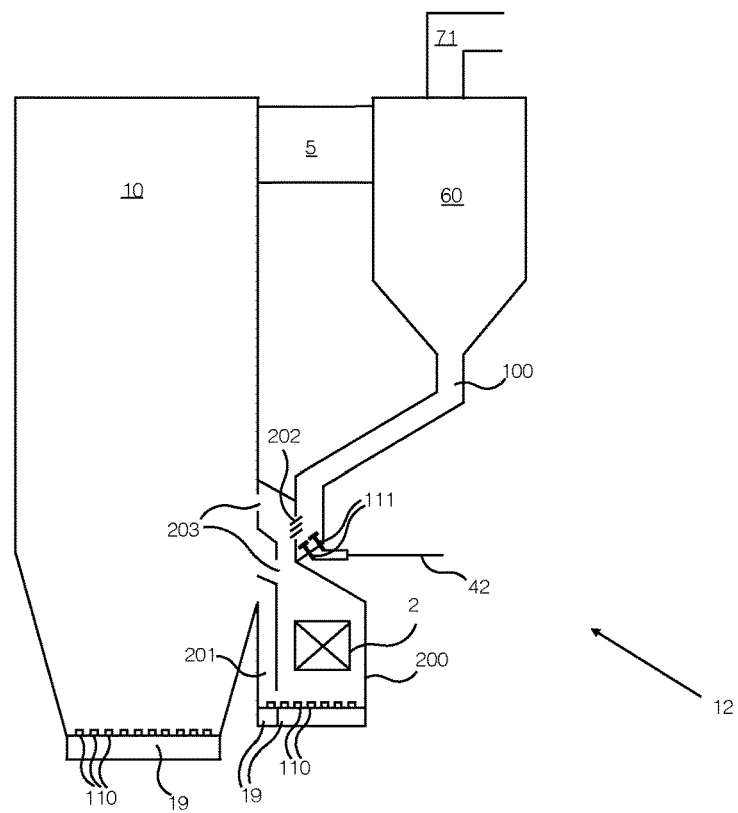

FIG. 9*b* schematically illustrates, according to an example, an arrangement of a heat exchanger chamber adjacent to a boiler, wherein the heat exchanger houses a superheater, and wherein the arrangement additionally comprises selectably supplying combustible gas to be combusted in the gas lock between a dip leg and the heat exchanger chamber.

Figure 10A:
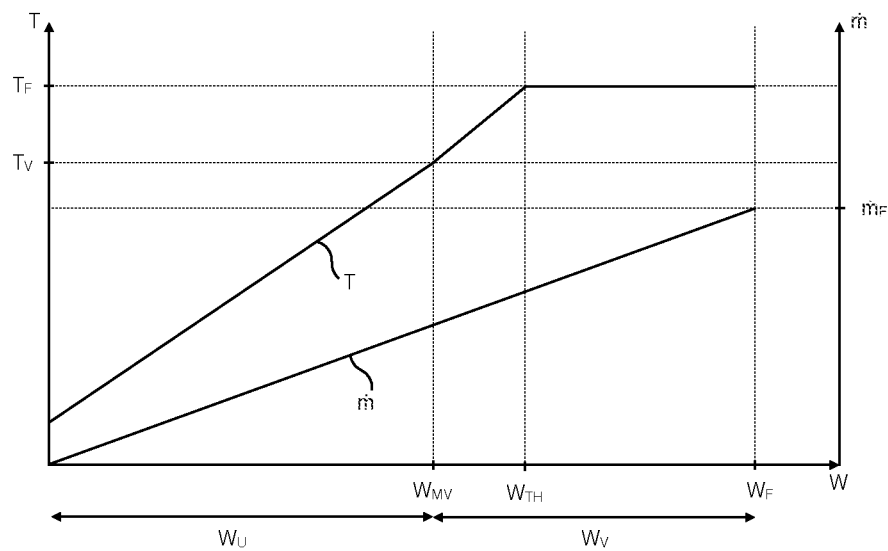

FIG. 10*a* schematically illustrates the idealized relationships of the mass flow of steam and the temperature of steam entering a steam turbine to the load of a steam turbine power plant in a conventional steam production system.

Figure 10B:
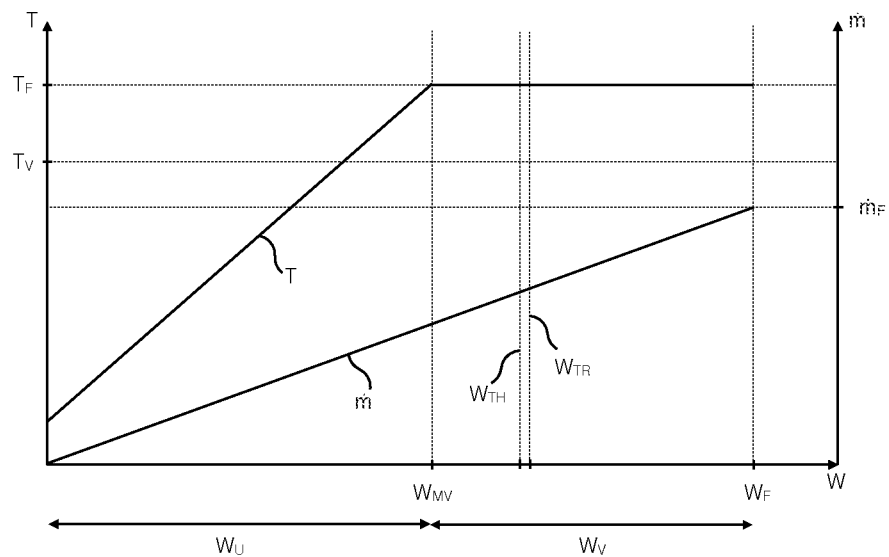

FIGS. 10*b* schematically illustrates the idealized relationships of the mass flow of steam and the temperature of steam entering a steam turbine to the load of a steam turbine power plant in a steam production system according to the disclosed solution.

Figure 11A:
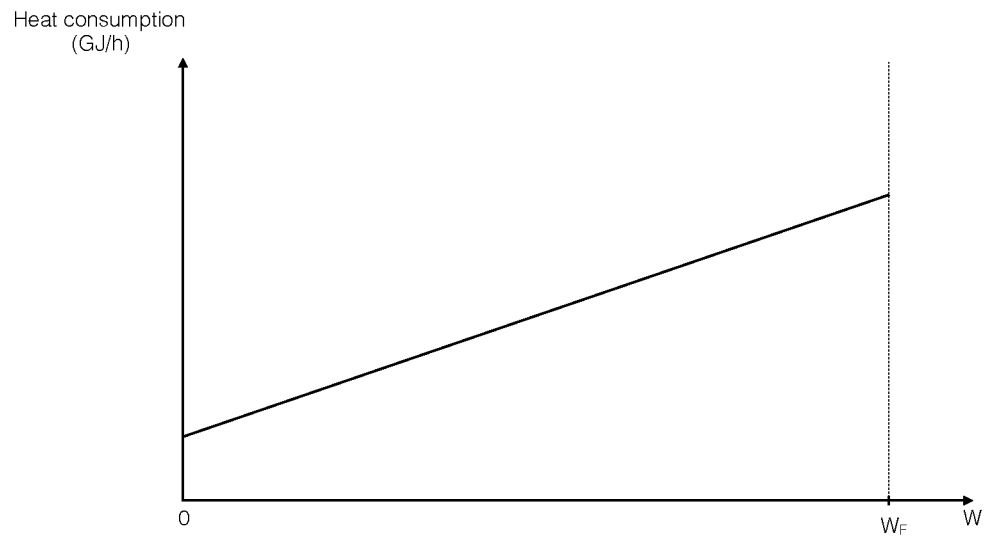

FIG. 11*a* schematically illustrates the idealized relationship between the load and the heat consumption of a power plant.

Figure 11B:
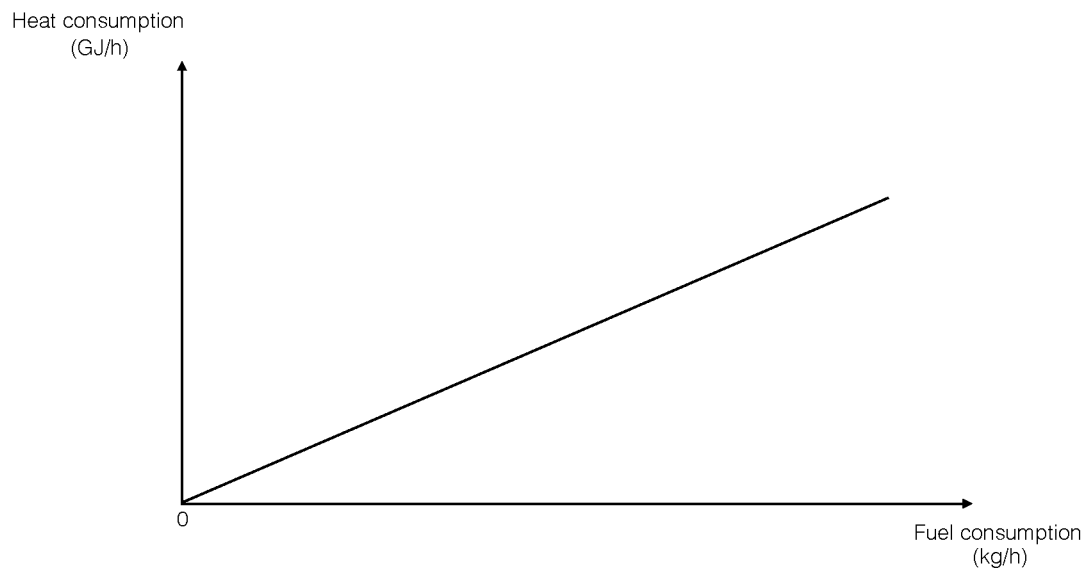

FIG. 11*b* schematically illustrates the idealized relationship between the fuel consumption and the heat consumption of a power plant.

Figure 12:
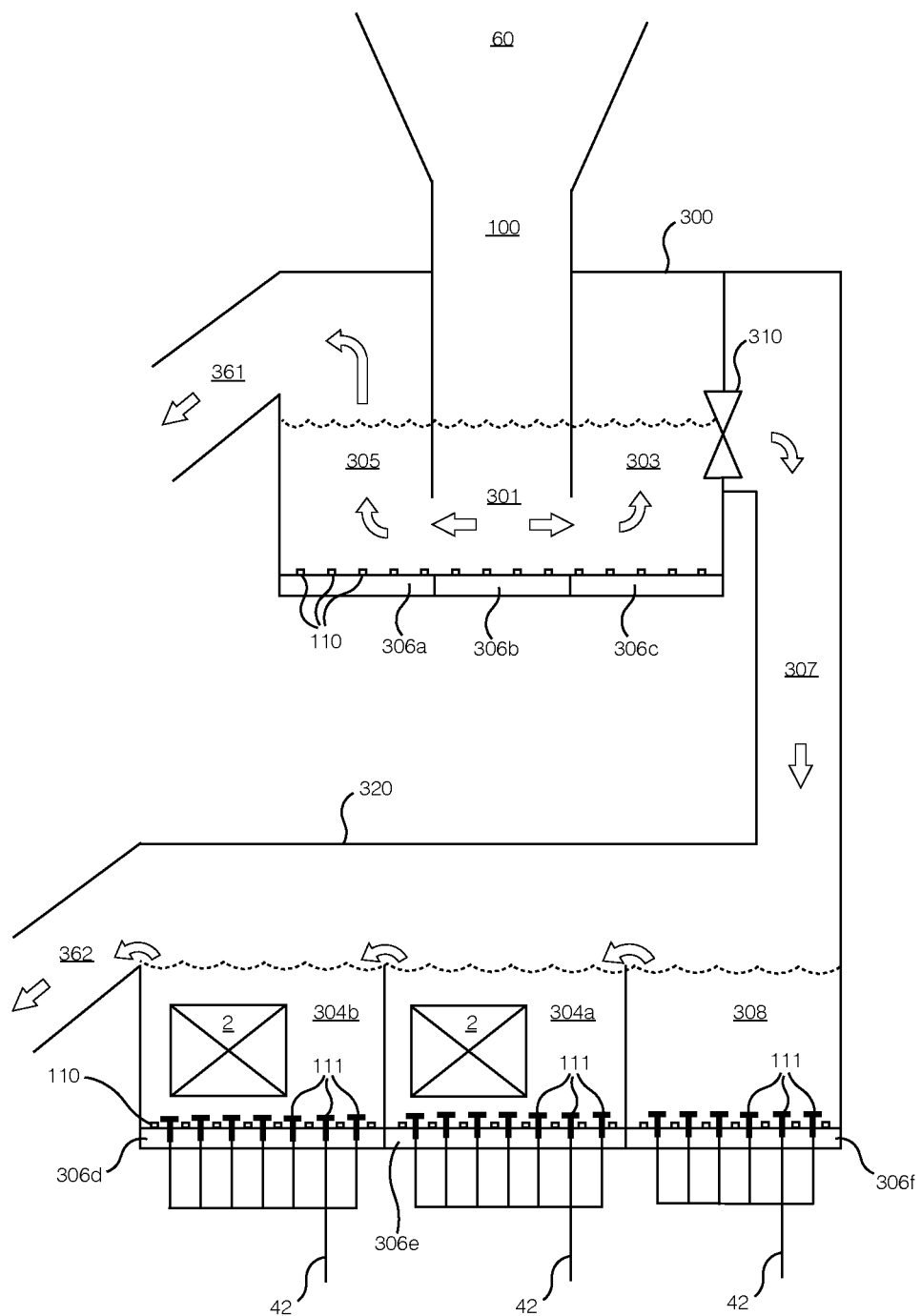

FIG. 12 schematically illustrates, according to an example, an arrangement comprising a loop seal chamber and an adjacent heat exchanger chamber, wherein the arrangement comprises selectably supplying combustible gas into the heat exchanger chamber.

Figure 13:
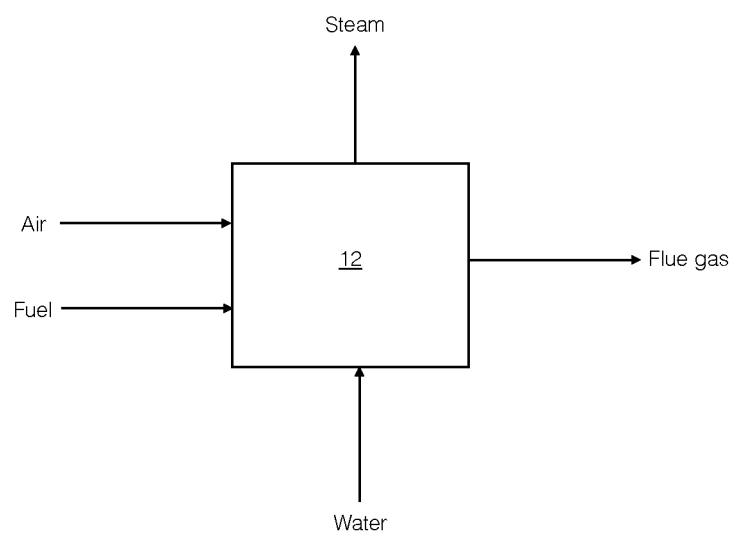

FIG. 13 schematically illustrates, for clarifying purposes, the notional scope of a boiler in terms its key inflows and outflows.

The figures are not in scale or suggestive of the physical layout or the dimensions of system components.

DETAILED DESCRIPTION OF VARIOUS EMBODIMENTS

In the text, reference is made to the figures with the following numerals and denotations:
W Load of a power plant at a point of time
$W_F$ Full rated load of a power plant
$W_{MV}$ Minimum rated viable load of a power plant
$W_{TH}$ Threshold load of a power plant
$W_{TR}$ Trigger load of a power plant
$W_U$ Load range for unviable operating of a power plant
$W_V$ Load range for viable operating of a power plant
T Temperature of steam entering a turbine
$T_F$ Maximum temperature of steam entering a turbine
$T_V$ Minimum viable temperature of steam entering a steam turbine
$\dot{m}$ Mass flow rate of steam
$\dot{m}_F$ Mass flow rate of steam with full boiler load
1 Loop seal heat exchanger chamber
2 Fluidized bed superheater
3 Steam turbine
4 Gasifier
5 Cooler
6 Fuel source
7 Filter
8 Heat exchanger
9 Generator
10 Furnace
11 Heat exchanger
12 Boiler
13 Electricity-consuming process
14 Condenser
15 Heat exchanger
16 Combustion chamber
19 Plenum
20 Pump
21 Fuel source
22 Heat-consuming process
25 Heat exchanger
31-57 Line
60 Solids separator
61 Loop seal outlet
70 Driveline
71,72 Duct
100 Dip leg
101 Distributing zone
102 Feeding upleg
103 Bypass upleg
104 Superheater chamber
105 Discharge upleg
106a-f Plenum
107 Recirculation channel
110 Nozzle
111 Gas nozzle
200 Heat exchanger chamber
201 Discharge passageway
202 Gas lock
203 Opening
300 Loop seal chamber
301 Distributing zone
303 Feeding upleg
304a,b Superheater chamber
305 Bypass upleg
306a-f Plenum
307 Dip leg
308 Entrance chamber
310 Valve
320 Heat exchanger chamber
361 Loop seal outlet
362 Heat exchanger chamber outlet In the text and in the figures, the notion of a "line" is used to refer to any suitable conveyance passageway without any definite characterization of the physical properties of the passageway. It is to be appreciated that a person skilled in the art is capable of determining the physical properties of a passageway according to the properties and the volume of the material to be conveyed as well as other such pertinent conveyance parameters and requirements.

In the text, unless otherwise specified, the notion of a "power plant" is used to refer to a steam turbine power plant wherein a steam turbine 3 may be used to convert thermal energy of steam into mechanical work, which mechanical work may be converted into electricity by a generator 9.

In the text, unless otherwise specified, the notion of a "boiler" 12 is used to refer to an assemblage of system elements comprising a furnace 10, a solids separator 60, ducts 72, 71, a loop seal heat exchanger chamber 1 or a loop seal chamber 300, heat exchangers 25, 11, 15 and a superheater or superheaters 2. As schematically illustrated in FIG. 13 for notional clarifying purposes, such assemblage takes in air, fuel and water, and provides steam and flue gas as key outputs.

In the text, the notion of a "fluidized bed material" is used to refer to bed material which, under normal operating conditions, circulates in the system. It is to be appreciated that in a fluidized bed, the "fluidized bed material" is in a fluidized state under normal operating conditions, but somewhere in the system and/or under some operating conditions, the "fluidized bed material" may also be in a non-fluidized state such as in a dip leg 100 via which the "fluidized bed material" may be conveyed back to the furnace 10 for re-use.

FIG. 1 schematically illustrates a conventional system for producing superheated steam to be used in a steam turbine 3. The system comprises a furnace 10 of a circulating fluidized bed type. In the system, there is a circulation of fluidized bed material, such as sand and/or ash, potentially with additives such as limestone, from the furnace 10 via a duct 72 to a solids separator 60 such as a cyclone, and from there via a dip leg 100 to a loop seal heat exchanger chamber 1, and from there via a loop seal outlet 61 back to the furnace 10. Such a circulation is henceforth referred to as the "outer circulation" of the fluidized bed material. By "internal circulation", in turn, is referred to the circulation of the fluidized bed material within a system element, such as within the furnace 10 or the loop seal heat exchanger chamber 1.

Still referring to FIG. 1, such a system may comprise a heat exchanger such as a fluidized bed superheater 2 located in the loop seal heat exchanger chamber 1 for superheating or providing the final superheating for the steam to be fed to the steam turbine 3. Such superheating of steam may be premised on transferring thermal energy from the fluidized bed material circulating in the system as described just above to the steam circulating in the system.

Superheated steam is steam at a temperature T which is higher than the boiling point of the substance, such as water, at a particular pressure. Steam in a superheated state contains no entrained liquid. Thus, the temperature T of superheated steam may decrease by some amount before entrained liquid begins to form. Therefore, the higher the temperature T of superheated steam, the more it may cool, i.e. release energy, before entrained liquid begins to form at a particular pressure.

Typically, steam of sufficiently high quality for a steam turbine 3 refers to steam which is superheated to such a temperature T that the superheated steam contains high enough energy so that it will not condensate prematurely in the steam turbine as it releases energy while travelling through the steam turbine 3.

Typically, the pressure of the steam entering the steam turbine 3 is kept constant in a power plant system. This pressure begins to decrease once steam enters the steam turbine 3, wherein the steam starts to release energy and expand.

In such a system, and as is known in the industry, the amount of thermal energy available to be transferred from the fluidized bed material to the steam, such as with the fluidized bed superheater 2 located in the loop seal heat exchanger chamber 1, is dependent on the amount of thermal energy transferred to the fluidized bed material earlier in the outer circulation in the furnace 10 and as a result of burning fuel in the furnace 10. Consequently, the less fuel is being burned in the furnace 10, the less thermal energy may be available in the fluidized bed material to be transferred to the steam, such as with the fluidized bed superheater 2. The less thermal energy is transferred to the steam in the fluidized bed superheater 2, the lower may be the temperature of the steam exiting the fluidized bed superheater 2 and conveyed via a line 31 to the steam turbine 3.

In such a system, and as is known in the industry, as the generation of thermal energy in the furnace 10 is reduced as a result of burning less fuel in the furnace 10, the outer circulation of the fluidized bed material is reduced in terms of mass flow of circulating fluidized bed material. That is, as the load W of the power plant is reduced, the outer circulation of the fluidized bed material may be reduced. This results in less thermal energy being available to be transferred from the circulating fluidized bed material into the steam in the fluidized bed superheater 2.

As is well known in the industry, the amount of thermal energy generated in the furnace 10 and/or transferred into the steam can be inferred, for example calculated, from the volume of fuel per unit of time being fed into the furnace 10 and the type of fuel being fed. Typically, the boiler 12 comprises an arrangement for automatically adjusting the amount of air and/or other gases required in the fuel burning process as a function of the amount of fuel being fed to the furnace 10. Such automatic adjustment of air and/or other gases may be effected, for example, by measuring the level of oxygen present in the combustion gases and adjusting the feed of fuel and/or the air and/or other gases such that an optimal oxygen level in the combustion gases, known as the lambda value, is obtained.

Conventionally, the temperature T of the steam entering the steam turbine 3 may, to a degree, be prevented from dropping as a result of a reduction in the load W of the power plant. As a first example, steam attemperation may be employed in a power plant to adjust steam temperature by, for example, spraying water into steam and thereby lowering its temperature to a desirable level. Hence, reducing the amount of attemperation will, ceteris paribus, cause the temperature T of the steam to rise. And as a second example, the proportion of fluidized bed material in the outer circulation which travels via the fluidized bed superheater 2 may be adjusted, thereby adjusting the amount of thermal energy arriving at the fluidizing bed superheater 2. Increasing the proportion of fluidized bed material in the outer circulation which travels via the fluidized bed superheater 2 will, ceteris paribus, cause the temperature T of the steam to rise.

However, once the use of such measures for preventing the steam temperature from dropping have been exhausted—for example such that the steam attemperation is discontinued and the proportion of fluidized bed material in the outer circulation travelling via the fluidized bed superheater 2 is set to its maximum—lowering of power plant load W typically results in the temperature T of steam entering into the steam turbine 3 getting lower. Henceforth, the load W of the power plant at which these measures have been exhausted is referred to as a threshold load $W_{TH}$ of the power plant, as illustrated in FIG. 10a. In other words, between the threshold load $W_{TH}$ and the full power plant load $W_F$, for example steam attemperation may be decreased and/or the proportion of the fluidized bed material in the outer circulation travelling via the fluidized bed superheater 2 may be increased in order to prevent the steam temperature T from dropping as the power plant load W decreases. Below the threshold load $W_{TH}$, such preventive measures are no longer sufficient to prevent the steam temperature T from dropping as the power plant load W further decreases.

Furthermore, with a low load W of the power plant, i.e. with little fuel being burned in the furnace 10, the outer circulation of the fluidized bed material may cease or nearly cease. As a result, the arrival of thermal energy with the fluidized bed material to the fluidized bed superheater 2 may cease or nearly cease.

Such a low load W of the power plant may be, for example, 55-60%, or 50-55%, or 45-50%, or 40-45%, or 35-40%, or 30-35%, or 25-30%, or 20-25% of its full rated load $W_F$. Such a low load may be below the threshold load $W_{TH}$.

Consequently, as the thermal energy available to be transferred in the fluidized bed superheater 2 into the steam to be supplied to the steam turbine 3 is reduced, particularly below the threshold load $W_{TH}$ of the power plant, the temperature T of said steam may be reduced as a result. This may have adverse and undesirable consequences such as the reduction of efficiency with which electricity is produced with the steam turbine 3. As another example of such adverse and undesirable consequences, said steam with a reduced temperature T may condense prematurely while travelling through the steam turbine 3, causing water droplets being formed which may hit and thereby damage the blades of the steam turbine 3.

The disclosed solution is intended to alleviate such adverse and undesirable consequences of reduced power plant load W by disclosing a way to introduce additional thermal energy to the fluidized bed material outside the furnace 10.

With the disclosed solution, it is possible to ensure that the fluidized bed material in contact and in the vicinity of the superheater 2 has sufficient amount of thermal energy to be transferred into the steam supplied to the steam turbine 3. Thus, with the disclosed solution, the reduced production of thermal energy in the furnace 10 and therefore the reduced transfer of thermal energy to the fluidized bed material in the furnace 10 can be compensated by additionally heating the fluidized bed material outside the furnace 10.

Therefore, with the disclosed solution, the temperature T of the steam can be maintained sufficiently high, for example at its maximum temperature $T_F$ or within a certain number of temperature degrees below the maximum temperature $T_F$, even with a reduced power plant load W, which reduced power plant load W may be below the threshold load $W_{TH}$.

According to the disclosed solution, such additional heating of the fluidized bed material may be done by supplying combustible gas into the fluidized bed material outside the furnace 10, whereby the combustion of the combustible gas releases additional thermal energy into the fluidized bed material. As an alternative or supplement similarly adhering, mutatis mutandis, to the general principles and implementation outlines of the disclosed solution, such additional heating of the fluidized bed material may be done by supplying combustible gas to a burner or burners outside the furnace 10, whereby the burning of the combustible gas releases additional thermal energy into the fluidized bed material.

FIG. 2 schematically illustrates, according to an example, a system for producing superheated steam to be used in a steam turbine 3 according to the solution, wherein the system comprises selectably supplying gas to be combusted in the loop seal heat exchanger chamber 1. In this system, steam enters the steam turbine 3 with a temperature T and a mass flow rate $\dot{m}$, the latter being defined as the mass of steam entering the steam turbine 3 per unit of time.

Determining steam properties may be performed by installing a flowmeter and/or a pressure sensor and/or a temperature sensor in a steam conveyance line, and relaying the signal(s) from this/these instrument(s) to an apparatus such as a dedicated steam flow computer and/or a control unit 23 for processing and/or storage. It is to be appreciated that determining steam properties is well known in the industry and appropriate equipment for this purpose commercially available. Steam properties, once determined for example through measurement, may be used as control input data by the control unit 23.

Still referring to FIG. 2, steam properties may be determined by way of measurement at least in a line 31 at its terminus at the steam turbine 3. In addition, as will be explained below, steam properties may be determined otherwise as well, for example based on measurements in other loci in the system.

Determining of the properties of steam, including its temperature, as it enters into the steam turbine 3 may be indirect. This means that steam properties may be measured further upstream or downstream, for example in the steam conveyance pathway which originates at a heat exchanger 15 and terminates at the steam turbine 3, and that the measurement results are converted into values for the properties of the steam to be determined, for example as it enters into the steam turbine 3, by using known conversion factors. Such known conversion factors may be obtained through, for example, comparative measurements at loci of interest, or they may be derived from calculations based on the physical properties of the system. The notion of determining steam properties, as it used in this text, includes also indirect determining as just described.

In a power plant, the pressure of the steam may be kept constant, at least when the power plant produces electricity, in which case the key properties of the steam entering the steam turbine 3 may in practical terms be captured by the temperature T of the steam entering the steam turbine 3.

The steam turbine 3 may be adapted to drive, via a driveline 70, an electric generator 9 which may supply electricity to an electricity-consuming process via a line 44. The electricity-consuming process may be a specific and/or a localized process such as in a manufacturing facility, or the electricity-consuming process may be aggregate electricity consumption in an electrical grid such as a district, a regional or a national electrical grid.

Still referring to FIG. 2, in the system, superheated steam may be produced by superheating steam or providing the final superheating for the steam in a fluidized bed superheater 2. Such a fluidized bed superheater 2 may be located in the loop seal heat exchanger chamber 1.

As is well known, apparatuses upstream from the fluidized bed superheater 2, such as a heat exchanger 25 and/or a heat exchanger 11 and/or a heat exchanger 15 or a plurality of such heat exchangers may be employed to vaporize and/or superheat the water circulating in the system such that the water is already steam or steam in a superheated state when it enters the fluidized bed superheater 2.

According to the example illustrated in FIG. 2, the heat exchangers 11, 15 may be installed in a duct 71, and the heat exchanger 25 may be installed in the furnace 10.

The fluidized bed superheater 2 may be a single heat exchanger device. Alternatively, the fluidized bed superheater 2 may be an aggregate of a plurality of individual heat exchanger devices. The same applies to the heat exchangers 25, 11, 15.

Still referring to FIG. 2, fuel may be supplied to the furnace 10 from a fuel source 21 via a line 49 to be burned in the furnace 10. Air or other suitable gas or gas mixture required for burning the fuel and/or bringing about fluidization of the fluidized bed material may be conveyed to the furnace 10 via a line 50 or multiple such lines. Non-gaseous combustion residues such as ash resulting from burning the fuel may be expelled from the furnace 10 via a line 51. Combustion gases resulting from burning the fuel as well as other gases possibly injected to the furnace 10 may be expelled together with the fluidized bed material from the furnace 10 via a duct 72 to the solids separator 60.

In the solids separator 60, the fluidized bed material may be separated from combustion and other possible gases. Thereby, the fluidized bed material may travel from the solids separator 60 via the dip leg 100 into the loop seal heat exchanger chamber 1. Correspondingly, the gases and a fine residue of the fluidized bed material such as fly ash may travel via a duct 71 to elsewhere in the process (not depicted). The solids separator 60 may be, for example, a cyclone.

Before being expelled from the duct 71, thermal energy may be captured from the combustion and other gases with heat exchangers 11, 15.

Still referring to FIG. 2, the loop seal heat exchanger chamber 1 may be arranged to receive the fluidized bed material in the outer circulation from the solids separator 60 such that gas flow is prevented from the furnace 10 via the loop seal outlet 61 and eventually to the solids separator 60, and such that the fluidized bed material may be returned to the furnace 1 via the loop seal outlet 61. One of the functions of the loop seal heat exchanger chamber 1 in the system typically is to prevent such gas back flow.

Such functionality of the loop seal heat exchanger chamber 1 may be brought about by arranging the travel of the fluidized bed material via different structurally defined areas in the loop seal heat exchanger chamber 1 as illustrated according to a typical setup in FIGS. 4a to 4c, in which the travel of the fluidized bed material is denoted with arrows. In FIGS. 4a to 4c, an average typical surface of fluidized bed material is schematically illustrated with an undulating dashed line. It is to be appreciated that due to possible fluidization in the loop seal heat exchanger chamber 1, the surface of the fluidized bed material is strictly speaking not definite. The same applies to other surfaces of fluidized bed material discussed below and illustrated in other Figures, unless otherwise specified.

As illustrated in FIG. 4a and FIG. 4b, which is an A-A cross section of the loop seal heat exchanger chamber 1 as denoted in FIG. 4a, the fluidized bed material in the outer circulation may arrive in the loop seal heat exchanger chamber 1 from the solids separator 60 via the dip leg 100, whereafter the flow of the fluidized bed material may be divided in a distribution zone 101 of the loop seal heat exchanger chamber 1 into two flows, one of which travels via a bypass upleg 103 to the loop seal outlet 61, and the other of which travels via a feeding upleg 102 to a superheater chamber 104. Such travel of the fluidized bed material may be brought about by feeding air or other appropriate non-combustible gas with nozzles 110 installed in plenums 106a-c, which nozzles 110 may have an appropriate directionality of injection. The discrete plenums 106a-c may enable feeding of air or other non-combustible gas with plenum-specific flow rates and/or directions into the distribution zone 101, the bypass upleg 103 and the feeding upleg 102, respectively, whereby the flow of the fluidized bed material may be controlled, such as controlling the proportion of the fluidized bed material travelling via the bypass upleg 103 and/or the feeding upleg 102.

Referring to FIGS. 4a and FIG. 4c, which is a B-B cross section of the loop seal heat exchanger chamber 1 as denoted in FIG. 4a, the fluidized bed superheater 2 may be located in the superheater chamber 104 section of the loop seal heat exchanger chamber 1, wherein the fluidized bed superheater 2 may be used to capture thermal energy form the fluidized bed material travelling through the superheater chamber 104. From the superheating chamber 104 the fluidized bed material may travel via a discharge upleg 105 to the bypass upleg 103 and thereafter to the loop seal outlet 61. The travel of the fluidized bed material through the superheater chamber 104 and the discharge upleg 105 may be controlled by feeding air or other appropriate non-combustible gas with nozzles 110 installed in plenums 106d-f, which nozzles 110 may have an appropriate directionality of injection. The discrete plenums 106d-f may enable feeding of air or other non-combustible gas with plenum-specific flow rates and/or directions. Alternatively, there may a different configuration of plenums such as one plenum common to the superheater chamber 104 and the discharge upleg 105.

It is to be appreciated that such partitioning of the loop seal heat exchanger chamber 1 is known in the industry and such knowledge readily applies to the loop seal heat exchanger chamber 1.

From the loop seal heat exchanger chamber 1, the fluidized bed material may be conveyed for re-use to the furnace 10 via the loop seal outlet 61.

Referring to FIGS. 10a and 10b, the power plant may be run with a load W, which refers to the amount of electricity generated by the generator 9 per unit of time, as driven by the steam turbine 3. As is well known in the industry, the amount of electricity generated by the generator 9 per unit of time, i.e. the power output of the generator 9, may be measured based on the voltage and current of the electricity output. Alternatively, or in addition, the load W of the power plant may be inferred from the heat consumption of the power plant, since it is well known that the load W of a power plant is highly correlated with its heat consumption. The heat consumption, in turn, can be inferred from the amount of fuel burned in and/of fed into the furnace 10 in a unit of time for the purposes of heat generation in the power plant. The precise relationships between the amount of fuel burned in a unit of time and heat consumption, and between heat consumption and load W is typically plant-specific due to, for example, plant-specific energy losses. FIGS. 11a and 11b illustrate the idealized relationships between these measures. Such measurements are a part of normal power plant instrumentation.

The volume of fuel being burned in the furnace 10 for the purposes of producing and heating steam and the load W of the power plant have a correlation which is characteristic for each power plant and known by the operators and/or programmed into the control apparatuses of the power plant. Thus, the load W of the power plant may be controlled by adjusting the fuel being burned for the purposes of producing and heating steam, and the amount of fuel being burned and/or fed can usually be taken as a reasonably proxy for the load W of the power plant.

The power plant may be run with different loads W, as illustrated in FIGS. 10a and 10b.

FIG. 10a represents the operation of a conventional system for producing steam to be used in a steam turbine 3. FIG. 10b represents the operation a system for producing steam to be used in a steam turbine 3 according to the disclosed solution comprising controllably providing additional heating to the fluidized bed material outside the furnace 10.

As illustrated in FIG. 10a, a power plant may have a full rated load $W_F$. This refers to the load W of the power plant which may be obtained with a full rated load of the furnace 10, i.e. when the maximum rated amount of fuel is being burned in the furnace 10. With the full rated load $W_F$, the maximum amount of thermal energy is being transferred in the heat exchangers 25, 11, 15 and the fluidized bed superheater 2 into the steam fed into the steam turbine 3. At this full rated load $W_F$ of the power plant, the temperature T of the superheated steam entering into the steam turbine 3 is at its maximum $T_F$, which may be the maximum temperature of the steam obtainable with full power plant load $W_F$.

The maximum temperature $T_F$ of the steam entering the steam turbine may be arranged to be less than would in principle be obtainable with the maximum amount of fuel being burned in the furnace 10. This arrangement may be brought about, for example, by controllably attemperating the steam and/or by adjusting the proportion of the fluidized bed material in the outer circulation travelling via the fluidized bed superheater 2, as explained earlier.

With such an arrangement, the temperature T of the steam entering the steam turbine 3 may be kept at the maximum temperature $T_F$ across the load range between the threshold load $W_{TH}$ and the full load $T_F$ of the power plant, as illustrated in FIG. 10a.

Still referring to FIG. 10a, below the threshold load $W_{TH}$ of the power plant, the temperature T of the superheated steam entering into the steam turbine 3 decreases from the maximum temperature $T_F$. Typically, the pressure of the superheated steam is kept constant, but the mass flow rate ṁ of the superheated steam entering the steam turbine 3 typically decreases as a function of the energy being transferred in the heat exchangers 25, 11, 15 and the fluidized bed superheater 2 into the steam, as illustrated in FIG. 10a.

Consequently, as the load W of the power plant decreases below the threshold load $W_{TH}$, the efficiency with which electricity is produced in the power plant is undesirably reduced, unless the disclosed solution is employed.

With respect to the fluidized bed superheater 2 in particular, the amount of thermal energy transferrable to the steam, thereafter to be supplied to the steam turbine 3, may be further influenced by adjusting the fluidization rate or fluidization rates in the loop seal heat exchanger chamber 1, such as increasing the rate of fluidized bed material circulation for increased transfer of thermal energy from the fluidized bed material to the steam in the fluidized bed superheater 2. Such influence may be brought about by, for example, adjusting the gas injection rate through plenums 106a-f to the corresponding nozzles 110. The supply of fluidization gas to the furnace 10 via the line 50 may be used in a similar manner towards the same end.

Such adjusting of fluidization rate or fluidization rates may not, however, be capable of maintaining the amount of thermal energy transfer from the fluidized bed material to the steam in the fluidized bed superheater 2 when the load W of the power plant further decreases.

In addition, low power plant loads W may increase the emissions of the power plant, which emissions may have a regulatory ceiling which may not be exceeded. In other words, there may be an emissions-imposed floor for the power plant load W beyond which the load W may not be reduced. Such an emissions ceiling may be reached because the supply of fluidization gas particularly to the furnace 10 may not be reduced, due to design and operational constraints, in full correspondence with the reduction in supply of fuel to the furnace 10.

Still referring to FIG. 10a, as the load W of the power plant gets lower from the threshold load $W_{TH}$, it may reach a minimum viable load $W_{MV}$ below which the power plant may not be viably operated. Such a minimum viable load $W_{MV}$ may be determined, for example, by the emissions ceiling as described above, and/or it may be determined by the minimum criteria for acceptable steam qualities such as its temperature T. The load range for unviable operating $W_U$ of the power plant is the load range with loads W below the minimum viable load $W_{MV}$. The range of viable operating $W_V$ of the power plant is, in turn, the load range with loads W at and above the minimum viable load $W_{MV}$.

At the minimum viable load $W_{MV}$, there may be very little outer circulation of the fluidized bed material, or the outer circulation of the fluidized bed material may have ceased.

According to the solution, and referring to FIG. 10b, the amount of thermal energy in the fluidized bed material transferrable to the steam in the fluidized bed superheater 2 may be increased by additionally heating the fluidized bed material outside the furnace 10. In this manner, and according to the solution, the decrease in the amount of thermal energy in the fluidized bed material resulting from the decreasing load W of the power plant may be compensated by additionally heating the fluidized bed material outside the furnace 10.

Thus, with the disclosed solution, the temperature T of the steam supplied to the steam turbine 3 may be maintained sufficiently high, preferably at the maximum temperature $T_F$, even when the power plant is run with a load W less than its threshold load $W_{TH}$. Consequently, the efficiency of electricity production may be increased with the disclosed solution under the circumstances in which the power plant is run with a load W less than its full rated load $W_F$, including below the threshold load $W_{TH}$.

According to an example, as illustrated in FIG. 2, the additional heating of the fluidized bed material outside the furnace 10 may be brought about by selectably injecting combustible gas from a fuel source 6 via a line 42 into the loop seal heat exchanger chamber 1, wherein the combustible gas is combusted as it comes into contact with the hot fluidized bed material. As a result, thermal energy is released to the fluidized bed material in the loop seal heat exchanger chamber 1. Consequently, the thermal energy transferred from the fluidized bed material to the steam in the fluidized bed superheater 2 may be increased.

In such a case, and in general, the combustion of the combustible gas when in contact with the fluidized bed material requires that the fluidized bed material is hot enough to ignite the combustible gas. The minimum temperature for this ignition depends on the gas being used. Typically, such minimum temperature required of the fluidized bed material to ignite the combustible gas may be in the range of 700-750° C., or 750-800° C., or 800-850° C. The same principle applies, mutatis mutandis, to other examples described below.

In such a case, and in general, the combustion of the combustible gas when in contact with the fluidized bed material requires that there is oxygen available for the combustion at or in the immediate vicinity of the locus of injection. This oxygen may be provided with the fluidization gas, such as in the example illustrated in FIG. 2 as supplied via the line 54. The same principle applies, mutatis mutandis, to other examples described below.

Still referring to the example illustrated in FIG. 2, with such selectable injection of combustible gas into the loop seal heat exchange chamber 1, the temperature T of the steam entering the steam turbine 3 may be maintained sufficiently high, preferably at its maximum temperature $T_F$, even under circumstances in which the outer circulation of the fluidized bed material has been reduced or has ceased and/or below the threshold load $W_{TH}$ of the power plant.

Such selectable injection of combustible gas into the loop seal heat exchanger chamber 1 may be done at least in two ways.

Firstly, as illustrated in FIG. 5b, combustible gas may be selectably injected, from a fuel source 6 via a line 42, with gas nozzles 111 installed in the feeding upleg 102 section of the loop seal heat exchanger chamber 1, for example in the floor of the feeding upleg 102 section. Consequently, the fluidized bed material may be provided with additional heating in the feeding upleg 102, before the fluidized bed material enters the superheater chamber 104 housing the fluidized bed superheater 2.

Secondly, as illustrated in FIG. 5c, combustible gas may be selectably injected, from the fuel source 6 via the line 42, with gas nozzles 111 installed in the superheater chamber 104 section of the loop seal heat exchanger chamber 1, for example in the floor of the superheater chamber 104. Consequently, the fluidized bed material may be provided with additional heating during its residence in the superheating chamber 104 housing the fluidized bed superheater 2.

In the above-mentioned two examples, and as illustrated in FIGS. 5a to 5c, the loop seal heat exchanger chamber 1 may be provided with a recirculation channel 107. Such a recirculation channel 107 may be an opening or other such conduit in the wall between the feeding upleg 102 section and the superheater chamber 104 section. Such a recirculation channel 107 may be provided in order to enable the circulation of the fluidized bed material within the loop seal heat exchange chamber 1, especially under the circumstances in which the outer circulation of the fluidized bed material has been significantly reduced or has ceased.

According to another example, as illustrated in FIG. 3, the additional heating of the fluidized bed material outside the furnace 10 may be brought about by selectably injecting, from a fuel source 6 via a line 42, combustible gas into a combustion chamber 16, wherein the combustible gas is combusted as it comes into contact with the hot fluidized bed material. The combustion chamber 16 may be arranged adjacent to the loop seal heat exchanger chamber 1 such that there is a solids circulation via lines 56, 57 between the loop seal heat exchanger chamber 1 and the combustion chamber 16. Such fluidized bed material circulation between the loop seal heat exchanger chamber 1 and the combustion chamber 16 may be brought about by injecting fluidization air or other suitable fluidization gas or gas mixture to the combustion chamber 16 via a line 37. Consequently, the circulation of fluidized bed material between the loop seal heat exchanger chamber 1 and the combustion chamber 16 may be brought about in accordance with the principle of communicating vessels via the lines 56 and 57.

Thereby, according to this example, the fluidized bed material may be additionally heated in the combustion chamber 16, whereafter the additional thermal energy may be transferred from the fluidized bed material to the steam in the fluidized bed superheater 2 in the loop seal heat exchanger chamber 1.

According to yet another example, as illustrated in FIG. 9a, the additional heating of the fluidized bed material outside the furnace 10 may be brought about by selectably injecting combustible gas, from a fuel source 6 via a line 42, with gas nozzles 111 into a heat exchanger chamber 200 adjacent to the furnace 10. Such gas nozzles 111 may be installed, for example, in the floor of the heat exchanger chamber 200. Thereby, the combustible gas may be combusted in the heat exchanger chamber 200 as it comes into contact with hot fluidized bed material, whereby thermal energy may be released to the fluidized bed material in the heat exchanger chamber 200 housing the fluidized bed superheater 2. Consequently, the thermal energy transferred from the fluidized bed material to the steam in the fluidized bed superheater 2 in the heat exchanger chamber 200 may be increased. For illustrative clarity, FIG. 8 illustrates a typical such setup without the injection of combustible gas according to the disclosed solution.

According to another example, as illustrated in FIG. 9b, the additional heating of the fluidized bed material outside the furnace 10 may be brought about by selectably injecting combustible gas, from a fuel source 6 via a line 42, with gas nozzles 111 into a gas lock 202 between the dip leg 100 and the heat exchanger chamber 200 adjacent to the furnace 10. Thus, the gas nozzles 111 may be installed in the gas lock 202, whereby thermal energy may be released to the fluidized bed material residing in and/or travelling through the gas lock 202 en route to the heat exchange chamber 200 housing the fluidized bed superheater 2. Consequently, the thermal energy transferred from the fluidized bed material to the steam in the fluidized bed superheater 2 in the heat exchanger chamber 200 may be increased.

According to another example still, as illustrated in FIG. 12, the additional heating of fluidized bed material outside the furnace 10 may be carried out in a heat exchanger chamber 320 arranged adjacent to a loop seal chamber 300 devoid of any superheater(s). In such a setup, a fluidized bed superheater 2 or a plurality of fluidized bed superheaters 2 may be located in the heat exchanger chamber 320. FIG. 12 exhibits a specific example with two fluidized bed superheaters 2 in the heat exchanger chamber 320, but alternatively the heat exchanger chamber 320 may be provided with one, three, four or more fluidized bed superheaters 2.

According to this example, the heat exchanger chamber 320 may be connected to the loop seal chamber 300 with a dip leg 307 through which the fluidized bed material may travel from the loop seal chamber 300 to the heat exchanger chamber 320. Such travel may be controlled by a valve 310 or a similar arrangement such that the issuance of fluidized bed material from the loop seal chamber 300 via a feeding upleg 303 to the dip leg 307 may be controlled in volume and/or selectably obstructed altogether.

According to this example, the heat exchanger chamber 320 may be partitioned into an entrance chamber 308 to which the fluidized bed material arrives from the dip leg 307, and one or more superheater chambers 304a,b housing the fluidized bed superheater(s) 2. According to this example, the additional heating of the fluidized bed material may be carried out by injecting combustible gas with nozzles 111 installed in the entrance chamber 308 and/or one or more of the superheater chamber(s) 304a,b. Consequently, the thermal energy transferred from the fluidized bed material to the steam in the fluidized bed superheater(s) 2 in the superheater chamber(s) 304a,b may be increased.

According to this example, the fluidized bed material may be conveyed to the furnace 10 for re-use from the loop seal chamber 300 via a bypass leg 305 followed by a loop seal outlet 361, and from the heat exchanger chamber 300 via a heat exchanger chamber outlet 362. The fluidized flow of fluidized bed material, depicted in FIG. 12 with arrows, may be controlled in the loop seal chamber 300 by injecting fluidization gas through plenums 306a-c into the nozzles 110, and, mutatis mutandis, in the heat exchanger chamber 320 through plenums 306d-f into the nozzles 110.

As an additional possibility, the combustible gas to be selectably injected to additionally heat the fluidized bed material outside the furnace 10 may be produced with a gasifier 4. FIGS. 6 and 7 illustrate this according to examples.

According to the example illustrated in FIG. 6, the combustible gas injected to be combusted in the loop seal heat exchanger chamber 1 may be product gas generated by gasification with a gasifier 4. In such a case, the fuel supply 6 may contain initial fuel to be gasified into the final fuel, i.e. into product gas, i.e. into combustible gas. Such initial fuels to be gasified may comprise, for example, biomass and/or waste. As illustrated in FIG. 6, initial fuel may be conveyed from the fuel source 6 via a line 39 to the gasifier 4. The final fuel may be conveyed from the gasifier 4 to loop seal heat exchanger chamber 1 via a line or lines 40, 41, 42.

The gasifier 4 may be of a known type, such as of the fluidizing bed type. For gasification, air or other suitable gas or gas mixture may be supplied to the gasifier 4 via a line 38 or multiple such lines. Gasification residues may be expelled from the gasifier via a line 36 or multiple such lines.

If the combustible gas is product gas produced with the gasifier 4, the product gas conveyance pathway comprising the lines 40, 41, 42 may further comprise a cooler 5 for cooling the product gas and/or a filter 7 for filtering out undesirable substances from the product gas before the product gas is supplied as the combustible gas into the loop seal heat exchanger chamber 1. The varieties and using of coolers and filters are well known in the industry, and such knowledge readily applies to the cooler 5 and the filter 7.

If the cooler 5 is so used, as illustrated in FIG. 6, thermal energy may be conveyed from the cooler 5 to a heat exchanger 8 installed between lines 32 and 48, wherein the heat energy may be released into the water or steam in lines 32 and 48. Such heat conveyance from the cooler 5 to the heat exchanger 8 may be brought about by circulating an appropriate heat transfer medium in the lines 52 and 53 between the cooler 5 and the heat exchanger 8.

If the combustible gas is product gas generated with the gasifier 4, product gas may be additionally conveyed via a line 47 to the furnace 10 to be used as fuel, for example as supplementary fuel, and/or as main fuel and/or as the only fuel for the boiler 10.

The preceding description about generating and using product gas as the combustible gas selectably injected according to the invention applies, mutatis mutandis, to different examples according to which combustible gas is selectably injected to additionally heat the fluidized bed material outside the furnace 10. Thus, product gas may be selectably injected as the combustible gas, for example, into the loop seal heat exchanger chamber 1 illustrated in FIG. 6, or into the combustion chamber 16 illustrated in FIG. 7, or into the heat exchange chamber 200 adjacent to the furnace 10 illustrated in FIG. 9, or into the heat exchanger chamber 320 adjacent to the loop seal chamber 300 illustrated in FIG. 12.

The selectable injection of combustible gas to additionally heat the fluidized bed material outside the furnace 10 may be effected by a control unit 23.

The control unit 23 may bring about such selectable injection of combustible gas by using, for example, steam quality measurements as input data. Said input data may comprise, for example, the temperature T of the steam entering the steam turbine 3, for example as measured at the terminus of the line 31 at the steam turbine 3.

As another example, the control unit 23 may bring about such selectable injection of combustible gas by using the load W of the power plant as input data. As explained above, the load W of the power plant may be inferred from amount of electricity generated by the generator 9 per unit of time, and/or from the heat consumption of the power plant and/or from the amount of fuel burned and/or fed into the furnace 10 in a unit of time.

Towards this end, and referring to FIG. 10b, there may be a trigger load $W_{TR}$ for the power plant. The trigger load $W_{TR}$ may be used to trigger the commencement of injecting combustible gas to additionally heat the fluidized bed material outside the furnace 10. For example, the injection of combustible gas may be commenced when the load W of the power plant becomes lower than, i.e. is below the trigger load $W_{TR}$. Alternatively, and as another example, the injection of combustible gas may be commenced when the load W is at or below the trigger load $W_{TR}$.

The trigger load $W_{TR}$ may be set, for example, to coincide with the threshold load $W_{TH}$ of the power plant. As another example, the trigger load $W_{TR}$ may be set above the threshold load $W_{TH}$, as illustrated in FIG. 10b. The trigger load $W_{TR}$ is greater than the minimum rated viable load $W_{MV}$ and less than the full rated load $W_F$ of the power plant.

According to the latter example, the trigger load $W_{TR}$ may be set, for example, such that measures for preventing the temperature T of the steam entering the steam turbine 3 from dropping with power plant loads W above the threshold load $W_{TH}$, such as attemperation of steam with water spraying, have not quite been exhausted when the injection of combustible gas is commenced.

For example, the injection of combustible gas may be commenced when 1% or 5% of 10% or 15% of the maximum attemperation water spraying volume is being used. In other words, the trigger load $W_{TR}$ for the power plant may be set to be such a load W at which 1% or 5% of 10% or 15% of the maximum water spraying volume is being used to keep the steam entering the steam turbine 3 at its maximum temperature $T_F$. By such a setting, attemperation measures may be used during injecting combustible gas to additionally heat fluidized bed material outside the furnace 10 so as to control, such as fine-tune, the temperature T of the steam entering the steam turbine 3. Such control may be, for example, keeping the temperature T of the steam entering the steam turbine 3 at or near its maximum temperature $T_F$ during the injection of the combustible gas.

By way of another example, the trigger load $W_{TR}$ may be set to a specific level of load W such as a percentage of the full power plant load $W_F$, for example 60% or 55% or 50% or 45% or 40% or 35% or 30% or 25% of the full power plant load $W_F$. Such a specific level of load W for the trigger load $W_{TR}$ may be such a load W below which the temperature T of the steam entering the steam turbine would drop from its maximum temperature $T_F$ unless the fluidized bed material is additionally heated outside the furnace 10.

The injection of combustible gas may be discontinued once the load W of the power plant is raised above the trigger load $W_{TR}$, or another set de-triggering load W (not specifically illustrated). Additionally, the injection of combustible gas may be discontinued once the load W of the power plant is lowered below its minimum rated viable load $W_{MV}$.

Alternatively, the injection of the combustible gas may be commenced once it is observed, for example by the control unit 23 that the temperature T of the steam entering the steam turbine 3 has dropped by a certain amount, for example by certain number of temperature degrees such as by 1° C., or 5° C., or 10° C., or 15° C., or 20° C. below the maximum temperature $T_F$. In other words, there may be an alert temperature $T_A$ which may be used as a trigger for commencing the injection of combustible gas in correspondence with what is explained above.

Alternatively, or in addition, the temperature of the fluidized bed material may similarly serve as a control signal, for example for the control unit 23. In such a case, the temperature of the fluidized bed material may be measured at or substantially near the place where the combustible gas is to be selectably injected, such as in the feeding upleg 102 and/or the superheater chamber 104 of the loop seal heat exchanger chamber 1 and/or in the combustion chamber 16 and/or the heat exchanger chamber 200 adjacent to the boiler 10 and/or the superheater chamber(s) 304a,b of the heat exchanger chamber 320 and/or the entrance chamber 308 of the heat exchanger chamber 320. The temperature of the fluidized bed material thusly measured may then be used as a trigger for control actions by, for example, the control unit 23. Such control actions may comprise, for example, discontinuing the selectable feeding of the combustible gas when the temperature of the fluidized bed material in the locus of injection is too low for adequate combustion of the combustible gas, which may imply reaching the minimum rated viable load $W_{MV}$ of the power plant, as illustrated in FIGS. 10b to 10d.

With respect to the examples provided above, and generally with respect to the disclosed solution, the gas nozzles 111 may advantageously be provided with a gas flow over the entire running load W range of the power plant such as over the load range for viable operating $W_V$ or over the combined load range of viable operating $W_V$ plus unviable operating $W_U$. By doing so the gas nozzles may be prevented from becoming clogged by the fluidized bed material. For example, the gas nozzles 111 may be provided with a flow of combustible gas when the power plant is run with a load below the trigger load $W_{TR}$, and be provided with a flow of non-combustible gas such as air when the power plant is run with a load at or above the trigger load $W_{TR}$ (the provision of non-combustible gas not specifically depicted).

As an additional possibility (not specifically depicted), the gas injected with the gas nozzles 111 during additional heating of the fluidized bed material may be a mixture of combustible gas and oxidizing gas such as oxygen-containing air. Such an arrangement may have a benefit of reducing or removing the need for the pre-existence of oxidizing gas in the locus of injection as the oxidizing gas required for the combustion of the combustible gas may be provided in conjunction with the combustible gas, at least to a degree.

Referring back to FIGS. 2 to 3 and 6 to 7, after the steam conveyed to the steam turbine 3 has been utilized in the steam turbine 3, it (i.e. water either in a gaseous or in a liquid state depending on its temperature and pressure) may be conveyed back to the furnace 10 via a pathway comprising line or lines 34, 35, 33, 32, 48.

As illustrated in FIG. 2, for example, this pathway may additionally comprise a condenser 14 for recovering heat from the steam and transferring it to a heat-consuming process 22. The condenser 14 may comprise a single condenser device, or it may comprise a plurality of individual condenser devices. The varieties and using of condensers are well known in the industry, and such knowledge readily applies to the condenser 14. The condenser 14 may be connected to a heat-consuming process 22 with lines 45, 46, in which a heat transfer medium, such as water, may circulate between the condenser 14 and the heat-consuming process 22.

In addition, or alternatively, the back conveyance pathway may comprise a pump or pumps 20 for effecting the circulation of the circulating substance such as water between the boiler 12 and the steam turbine 3.

Advantageously, and referring to FIGS. 10*b* to 10*d*, the amount of combustible gas injected in accordance with the solution is selected such that when the power plant is run with a load W below the trigger load $W_{TR}$, the energy content of the combustible gas is, when combusted, sufficient for further superheating the steam originating from the fluidized bed superheater 2 such that at least the minimum viable temperature $T_V$ of the steam entering the steam turbine 3 is satisfied and preferably such that the temperature T of the steam entering the steam turbine 3 is maintained at or very close to its maximum temperature $T_F$. Controlling of the amount of injected combustible gas may be performed, for instance, by the control unit 23, wherein there may be a pre-programmed injection volume map for different loads W of the power plant based, for example, on the known energy contents per unit of volume of the gas being injected.

The disclosed solution is not limited to the examples and embodiments presented above. Furthermore, these examples and embodiments should not be considered as limiting but they can be used in various combinations to provide desired results. More specifically, the disclosed solution is defined by the appended claims.

The invention claimed is:

1. A method of maintaining the temperature of steam supplied to a steam turbine of a steam turbine power plant, which power plant further comprises a circulating fluidized bed boiler comprising a furnace and a fluidized bed superheater configured to superheat steam supplied to the steam turbine by transferring thermal energy to said steam from fluidized bed material, the method comprising:
   selecting a trigger load for the power plant, which trigger load is less than the full rated load of the power plant and greater than the minimum rated viable load of the power plant,
   determining the load of the power plant,
   when the load of the power plant is at or above the trigger load, superheating steam with the fluidized bed superheater such that the temperature of the superheated steam entering the steam turbine is at or near its maximum temperature, and
   when the load of the power plant is below the trigger load:
      injecting combustible gas into the fluidized bed material outside the furnace, the combustible gas being ignited by the fluidized bed material when the combustible gas comes into contact with the fluidized bed material having a temperature at or above a minimum temperature required to ignite the combustible gas,
   superheating steam with the fluidized bed superheater, additionally heating the fluidized bed material outside the furnace such that the temperature of the superheated steam entering the steam turbine is at or near its maximum temperature, wherein the additional heating of the fluidized bed material is brought about by combustion of the injected combustible gas, and
   conveying the superheated steam from the fluidized bed superheater to the steam turbine.

2. The method according to claim 1, wherein the additional heating of the fluidized bed material occurs, with respect to an outer circulation of the fluidized bed material, at or before the fluidized bed superheater and after the fluidized bed material has exited the furnace.

3. The method according to claim 1, wherein the additional heating of the fluidized bed material occurs, with respect to an outer circulation of the fluidized bed material, at or before the fluidized bed superheater but not earlier than the entrance of the fluidized bed material into a loop seal heat exchanger chamber.

4. The method according to claim 3, wherein the additional heating of the fluidized bed material occurs in the loop seal heat exchanger chamber.

5. The method according to claim 4, wherein the combustible gas is injected into the fluidized bed material by means of gas injection nozzles in the loop seal heat exchanger chamber.

6. The method according to claim 3, wherein the additional heating of the fluidized bed material occurs in a combustion chamber, which combustion chamber is arranged adjacent to the loop seal heat exchanger chamber such that there is a circulation of fluidized bed material between the loop seal heat exchanger chamber and the combustion chamber.

7. The method according to claim 6, wherein the combustible gas is injected into the fluidized bed material by means of gas injection nozzles in the combustion chamber (16).

8. The method according to claim 2, wherein the additional heating of the fluidized bed material occurs in a heat exchanger chamber which heat exchanger chamber houses the fluidized bed superheater and is arranged adjacent to the furnace, and wherein the combustible gas is injected into the fluidized bed material by means of gas injection nozzles in the heat exchanger chamber.

9. The method according to claim 2, wherein the additional heating of the fluidized bed material occurs in a gas lock located between a dip leg and a heat exchanger chamber which heat exchanger chamber houses the fluidized bed superheater and is arranged adjacent to the furnace.

10. The method according to claim 9, wherein the combustible gas is injected into the fluidized bed material by means of gas injection nozzles in the gas lock.

11. The method according to claim 2, wherein the additional heating of the fluidized bed material occurs in a heat exchanger chamber housing at least one superheater and arranged adjacent to a loop seal chamber devoid of any superheater(s).

12. The method according to claim 11, wherein the combustible gas is injected into the fluidized bed material by means of gas injection nozzles in the heat exchanger chamber.

13. The method according to claim 1, wherein the combustion of the combustible gas is brought about by providing oxygen with fluidization gas which is required for bringing about fluidization of the fluidized bed material.

14. The method according to claim 1, wherein the additional heating of the fluidized bed material is brought about by additionally burning combustible gas with a burner within or in the vicinity of the fluidized bed material.

15. The method according to claim 14, wherein the burner is configured to burn the combustible gas in at least one of: a loop seal heat exchanger chamber, a combustion chamber, a heat exchanger chamber, a gas lock, or a heat exchanger chamber.

16. The method according to claim 1, the method further comprising generating product gas by gasification with a gasifier and using said product gas as the combustible gas.

17. A system, comprising:
a steam turbine,
a circulating fluidized bed boiler comprising a furnace and a fluidized bed superheater configured to superheat steam supplied to the steam turbine by transferring thermal energy to said steam from fluidized bed material, and
a control unit configured to:
receive a set value for a trigger load for a power plant comprising the system which trigger load is less than the full rated load of the power plant and greater than the minimum rated viable load of the power plant,
determine the load of the power plant, and
when the load of the power plant is below the trigger load, control injection of combustible gas into the fluidized bed material outside the furnace such that the temperature of steam entering the steam turbine is maintained at or near its maximum temperature, wherein additional heating of the fluidized bed material is brought about by combustion of the combustible gas which is injected into the fluidized bed material and ignited by the fluidized bed material when the combustible gas comes into contact with the fluidized bed material having a temperature at or above a minimum temperature required to ignite the combustible gas.

18. The system according to claim 17, the system further comprising a loop seal heat exchanger chamber provided with gas injection nozzles configured to inject the combustible gas into the fluidized bed material.

19. The system according to claim 17, the system further comprising:
a combustion chamber arranged adjacent to a loop seal heat exchanger chamber such that there is a circulation of fluidized bed material between the loop seal heat exchanger chamber and the combustion chamber, and
gas injection nozzles in the combustion chamber configured to inject the combustible gas into the fluidized bed material.

20. The system according to claim 17, the system further comprising:
a heat exchanger chamber housing the fluidized bed superheater and arranged adjacent to the boiler, and
gas injection nozzles in the heat exchanger chamber configured to inject the combustible gas into the fluidized bed material.

21. The system according to claim 17, the system further comprising:
a heat exchanger chamber housing the fluidized bed superheater and arranged adjacent to the boiler,
a gas lock located between a dip leg and the heat exchanger chamber, and
gas injection nozzles in the gas lock configured to inject the combustible gas into the fluidized bed material.

22. The system according to claim 17, the system further comprising:
a heat exchanger chamber housing at least one superheater and arranged adjacent to a loop seal chamber devoid of any superheater(s), and
gas injection nozzles in the heat exchanger chamber configured to inject the combustible gas into the fluidized bed material.

23. The system according to claim 17, the system further comprising:
one or more burners within or in the vicinity of the fluidized bed material and configured to burn the combustible gas in at least one of: a loop seal heat exchanger chamber, a combustion chamber, a heat exchanger chamber, a gas lock, or a heat exchanger chamber.

24. The system according to claim 18, the system further comprising:
one or more burners within or in the vicinity of the fluidized bed material and configured to burn combustible gas in the loop seal heat exchanger chamber, and
nozzles installed in plenums and configured to feed air or non-combustible gas, wherein circulation of the fluidized bed material in the loop seal heat exchanger chamber is adjustable.

25. The system according to claim 17, the system further comprising:
a gasifier configured to generate product gas, and
lines configured to convey the product gas from the gasifier to at least one of:
gas injection nozzles for injection, or
one or more burners for burning as the combustible gas.

* * * * *